(12) United States Patent
Sirohey et al.

(10) Patent No.: US 7,421,136 B2
(45) Date of Patent: Sep. 2, 2008

(54) IMAGE TESSELLATION FOR REGION-SPECIFIC COEFFICIENT ACCESS

(75) Inventors: Saad A. Sirohey, Pewaukee, WI (US); Robert D. Barnes, Palatine, IL (US); Jan de Vaan, Houten (NL); Sudipta Mukhopadhyay, Bangalore (IN); Frederick Wilson Wheeler, Latham, NY (US)

(73) Assignee: GE Medical Systems Information Technologies Inc., Milwaukee, WI (US)

( * ) Notice: Subject to any disclaimer, the term of this patent is extended or adjusted under 35 U.S.C. 154(b) by 530 days.

(21) Appl. No.: 09/996,301

(22) Filed: Nov. 21, 2001

(65) Prior Publication Data
US 2002/0057844 A1 May 16, 2002

Related U.S. Application Data

(63) Continuation-in-part of application No. 09/716,603, filed on Nov. 20, 2000, now Pat. No. 6,912,319, which is a continuation-in-part of application No. 09/448,950, filed on Nov. 24, 1999, now Pat. No. 6,633,674.

(51) Int. Cl.
*G06K 9/36* (2006.01)
(52) U.S. Cl. .................................... 382/240
(58) Field of Classification Search ................. 382/240, 382/232, 233, 248, 243, 239, 238, 251; 375/240.05, 375/240.16; 358/426.02; 709/203; 341/59
See application file for complete search history.

(56) References Cited

U.S. PATENT DOCUMENTS

| | | | |
|---|---|---|---|
| 5,710,835 A | 1/1998 | Bradley | |
| 5,867,602 A | 2/1999 | Zandi et al. | |
| 5,881,176 A | 3/1999 | Keith et al. | |
| 6,091,777 A | 7/2000 | Guetz et al. | |
| 6,157,746 A * | 12/2000 | Sodagar et al. | 382/240 |
| 6,314,452 B1 | 11/2001 | Dekel et al. | |
| 6,445,823 B1 | 9/2002 | Liang | |
| 6,549,666 B1 | 4/2003 | Schwartz | |
| 6,553,141 B1 | 4/2003 | Huffman | |

(Continued)

FOREIGN PATENT DOCUMENTS

EP 0 971 544 1/2000

(Continued)

OTHER PUBLICATIONS

"JPEG 2000 Image coding system," ISO/IEC JTC 1/SC 29/WG 1. JPEG 2000, Mar. 16, 2000.*

(Continued)

*Primary Examiner*—Wenpeng Chen
(74) *Attorney, Agent, or Firm*—Fletcher Yoder

(57) ABSTRACT

The present technique addressably handles image data, which is decomposed and tessellated into a plurality of tessellated sub-band blocks. The tessellated sub-band blocks may be addressed by an array of indices, which identify specific data blocks of the image data by decomposition level and spatial coordinates of the tessellated sub-band blocks. Accordingly, a desired region of the image data at multiple resolutions can be identified and individually handled for storage, transmission, retrieval, and display. The desired region also can be reference marked based on the array of indices.

69 Claims, 22 Drawing Sheets

U.S. PATENT DOCUMENTS

| | | |
|---|---|---|
| 6,556,724 B1 | 4/2003 | Chang et al. |
| 6,574,629 B1 * | 6/2003 | Cooke, Jr. et al. ............ 707/10 |
| 6,633,674 B1 | 10/2003 | Barnes et al. |
| 6,711,297 B1 | 3/2004 | Chang et al. |
| 6,734,880 B2 | 5/2004 | Chang et al. |
| 6,763,139 B1 * | 7/2004 | Andrew .................... 382/240 |
| 6,778,709 B1 * | 8/2004 | Taubman .................... 382/240 |
| 6,792,151 B1 | 9/2004 | Barnes et al. |
| 6,795,583 B1 | 9/2004 | Barnes et al. |
| 6,912,317 B1 | 6/2005 | Barnes et al. |
| 6,912,319 B1 | 6/2005 | Barnes et al. |
| 6,925,208 B1 | 8/2005 | Huffman |
| 6,938,211 B1 | 8/2005 | Chang et al. |
| 7,006,696 B2 | 2/2006 | Huffman |
| 7,024,046 B2 | 4/2006 | Dekel et al. |
| 7,050,639 B1 | 5/2006 | Barnes et al. |
| 7,076,104 B1 | 7/2006 | Keith et al. |
| 7,088,866 B2 | 8/2006 | Andrew |
| 2002/0003906 A1 | 1/2002 | Zeng et al. |
| 2002/0044696 A1 | 4/2002 | Sirohey et al. |
| 2002/0057850 A1 | 5/2002 | Sirohey et al. |
| 2003/0005140 A1 | 1/2003 | Dekel et al. |
| 2003/0059096 A1 | 3/2003 | Dekel et al. |
| 2004/0179744 A1 | 9/2004 | Chang et al. |
| 2005/0271283 A1 | 12/2005 | Dekel et al. |

FOREIGN PATENT DOCUMENTS

| | | |
|---|---|---|
| WO | WO 96/29818 | 9/1996 |
| WO | WO 99/53429 | 10/1999 |

OTHER PUBLICATIONS

Bilgin, Ali et al.; "Efficient Lossless Coding of Medical Image Volumes Using Reversible Integer Wavelet Transforms," Proceedings DCC '98 (IEEE Data Compression Conference), 1998.

* cited by examiner

FIG. 7

16 – BIT LOSSLESS ENCODING
SCHEME 0 – MAX RATIO = 16:1

| HUFFMAN CODE PREFIX | CODE EXTENSION | DIFFERENCE d | CODE LENGTH | ENCODED RANGE WIDTH |
|---|---|---|---|---|
| 0 | | 0 | 1 | 0 |
| 100 | | +1 | 3 | +1 |
| 101 | | −1 | 3 | |
| 1100 | X | +2 TO +3 | 5 | +2 |
| 1101 | X | −2 TO −3 | 5 | |
| 11100 | XX | +4 TO +7 | 7 | +4 |
| 11101 | XX | −4 TO −7 | 7 | |
| 111100 | XXX | +8 TO +15 | 9 | +8 |
| 111101 | XXX | −8 TO −15 | 9 | |
| 1111100 | XXXX | +16 TO +31 | 11 | +16 |
| 1111101 | XXXX | −16 TO −31 | 11 | |
| 11111100 | XXXXX | +32 TO +63 | 13 | +32 |
| 11111101 | XXXXX | −32 TO −61 | 13 | |
| 111111100 | XXXXXX | +64 TO +127 | 15 | +64 |
| 111111101 | XXXXXX | −64 TO −127 | 15 | |
| 1111111100 | XXXXXXX | +128 TO +255 | 17 | +128 |
| 1111111101 | XXXXXXX | −128 TO −255 | 17 | |
| 11111111100 | XXXXXXXX | +256 TO +511 | 19 | +256 |
| 11111111101 | XXXXXXXX | −256 TO −511 | 19 | |
| 11111111110 | <16 BITS) | ACTUAL VALUE | 27 | |
| 11111111111 | | END OF BLOCK | 11 | |

FIG. 8

SCHEME 1 – MAX RATIO = 5.33:1

| HUFFMAN CODE PREFIX | CODE EXTENSION | DIFFERENCE d | CODE LENGTH | ENCODED RANGE WIDTH |
|---|---|---|---|---|
| 00 | X | 0 TO +1 | 3 | 1 |
| 01 | X | −1 TO −2 | 3 | |
| 100 | XX | +2 TO +5 | 5 | +4 |
| 101 | XX | −3 TO −6 | 5 | |
| 1100 | XXX | +6 TO +13 | 7 | +8 |
| 1101 | XXX | −7 TO −14 | 7 | |
| 11100 | XXXX | +14 TO +29 | 9 | +16 |
| 11101 | XXXX | −15 TO −30 | 9 | |
| 111100 | XXXXX | +30 TO +61 | 11 | +32 |
| 111101 | XXXXX | −31 TO −62 | 11 | |
| 1111100 | XXXXXX | +62 TO +125 | 13 | +64 |
| 1111101 | XXXXXX | −63 TO −126 | 13 | |
| 11111100 | XXXXXXX | +126 TO +253 | 15 | +128 |
| 11111101 | XXXXXXX | −127 TO −254 | 15 | |
| 111111100 | XXXXXXXX | +254 TO +509 | 17 | +256 |
| 111111101 | XXXXXXXX | −255 TO −510 | 17 | |
| 1111111100 | XXXXXXXXX | +510 TO +1021 | 19 | +512 |
| 1111111101 | XXXXXXXXX | −511 TO −1022 | 19 | |
| 1111111110 | <16 BITS) | ACTUAL VALUE | 26 | |
| 1111111111 | | END OF BLOCK | 10 | |

FIG. 9

SCHEME 2 — MAX RATIO = 4:1

| HUFFMAN CODE PREFIX | CODE EXTENSION | DIFFERENCE d | CODE LENGTH | ENCODED RANGE WIDTH |
|---|---|---|---|---|
| 00 | XX | 0 TO +3 | 4 | 3  ←—186 |
| 01 | XX | −1 TO −4 | 4 | |
| 100 | XXX | +4 TO +11 | 6 | +8 |
| 101 | XXX | −5 TO −12 | 6 | |
| 1100 | XXXX | +12 TO +27 | 8 | +16 |
| 1101 | XXXX | −13 TO −28 | 8 | |
| 11100 | XXXXX | +28 TO +59 | 10 | +32 |
| 11101 | XXXXX | −29 TO −60 | 10 | |
| 111100 | XXXXXX | +60 TO +123 | 12 | +64 |
| 111101 | XXXXXX | −61 TO −124 | 12 | |
| 1111100 | XXXXXXX | +124 TO +251 | 14 | +128 |
| 1111101 | XXXXXXX | −125 TO −252 | 14 | |
| 11111100 | XXXXXXXX | +252 TO +507 | 16 | +256 |
| 11111101 | XXXXXXXX | −253 TO −508 | 16 | |
| 111111100 | XXXXXXXXX | +508 TO +1019 | 18 | +512 |
| 111111101 | XXXXXXXXX | −509 TO −1020 | 18 | |
| 111111110 | <16 BITS) | ACTUAL VALUE | 25 | |
| 111111111 | | END OF BLOCK | 9 | |

FIG. 10

SCHEME 3 — MAX RATIO = 3.2:1

| HUFFMAN CODE PREFIX | CODE EXTENSION | DIFFERENCE d | CODE LENGTH | ENCODED RANGE WIDTH |
|---|---|---|---|---|
| 00 | XXX | 0 TO +7 | 5 | 7  ←—188 |
| 01 | XXX | −1 TO −8 | 5 | |
| 100 | XXXX | +8 TO +23 | 7 | +16 |
| 101 | XXXX | −9 TO −24 | 7 | |
| 1100 | XXXXX | +24 TO +55 | 9 | +32 |
| 1101 | XXXXX | −25 TO −56 | 9 | |
| 11100 | XXXXXX | +56 TO +119 | 11 | +64 |
| 11101 | XXXXXX | −57 TO −120 | 11 | |
| 111100 | XXXXXXX | +120 TO +247 | 13 | +128 |
| 111101 | XXXXXXX | −121 TO −248 | 13 | |
| 1111100 | XXXXXXXX | +248 TO +503 | 15 | +256 |
| 1111101 | XXXXXXXX | −249 TO −504 | 15 | |
| 11111100 | XXXXXXXXX | +504 TO +1015 | 17 | +512 |
| 11111101 | XXXXXXXXX | −505 TO −1016 | 17 | |
| 11111110 | <16 BITS) | ACTUAL VALUE | 24 | |
| 11111111 | | END OF BLOCK | 8 | |

FIG. 11

SCHEME 4 — MAX RATIO = 2.67:1

| HUFFMAN CODE PREFIX | CODE EXTENSION | DIFFERENCE d | CODE LENGTH | ENCODED RANGE WIDTH |
|---|---|---|---|---|
| 00 | XXXX | 0 TO +15 | 6 | 15 |
| 01 | XXXX | −1 TO −16 | 6 | |
| 100 | XXXXX | +16 TO +47 | 8 | +32 |
| 101 | XXXXX | −17 TO −48 | 8 | |
| 1100 | XXXXXX | +48 TO +111 | 10 | +64 |
| 1101 | XXXXXX | −49 TO −112 | 10 | |
| 11100 | XXXXXXX | +112 TO +239 | 12 | +128 |
| 11101 | XXXXXXX | −113 TO −240 | 12 | |
| 111100 | XXXXXXXX | +240 TO +495 | 14 | +256 |
| 111101 | XXXXXXXX | −241 TO −496 | 14 | |
| 1111100 | XXXXXXXXX | +496 TO +1007 | 16 | +512 |
| 1111101 | XXXXXXXXX | −497 TO −1008 | 16 | |
| 1111110 | <16 BITS> | ACTUAL VALUE | 23 | |
| 1111111 | | END OF BLOCK | 7 | |

SCHEME 5 — MAX RATIO = 2.29:1

| HUFFMAN CODE PREFIX | CODE EXTENSION | DIFFERENCE d | CODE LENGTH | ENCODED RANGE WIDTH |
|---|---|---|---|---|
| 00 | XXXXX | 0 TO +31 | 7 | 31 |
| 01 | XXXXX | −1 TO −32 | 7 | |
| 100 | XXXXXX | +32 TO +95 | 9 | +64 |
| 101 | XXXXXX | −33 TO −96 | 9 | |
| 1100 | XXXXXXX | +96 TO +223 | 11 | +128 |
| 1101 | XXXXXXX | −97 TO −224 | 11 | |
| 11100 | XXXXXXXX | +224 TO +479 | 13 | +256 |
| 11101 | XXXXXXXX | −225 TO −480 | 13 | |
| 111100 | XXXXXXXXX | +480 TO +991 | 15 | +512 |
| 111101 | XXXXXXXXX | −481 TO −992 | 15 | |
| 111110 | <16 BITS> | ACTUAL VALUE | 22 | |
| 111111 | | END OF BLOCK | 6 | |

192

FIG. 14
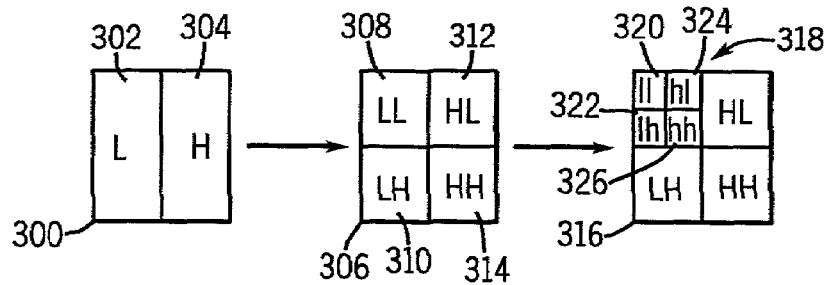
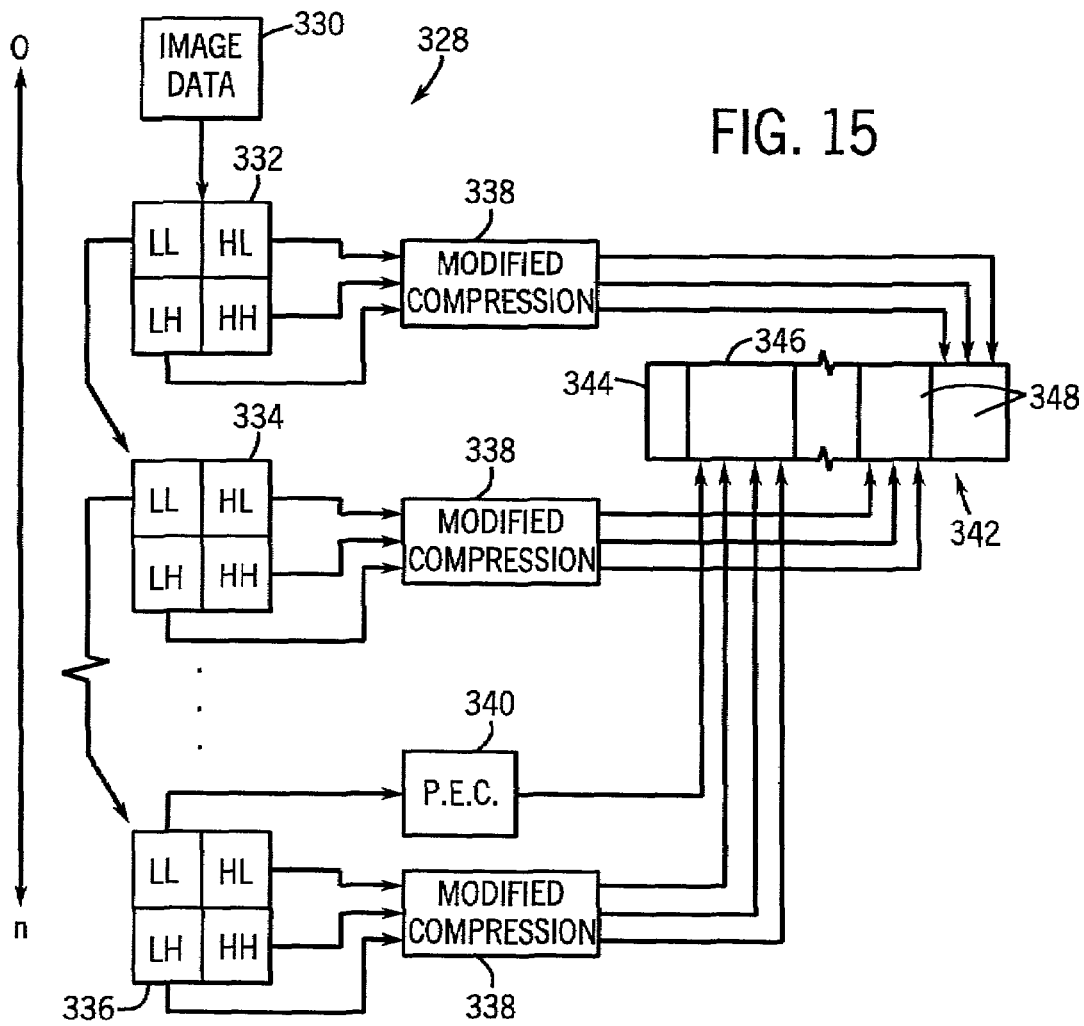
FIG. 15

FIG. 18
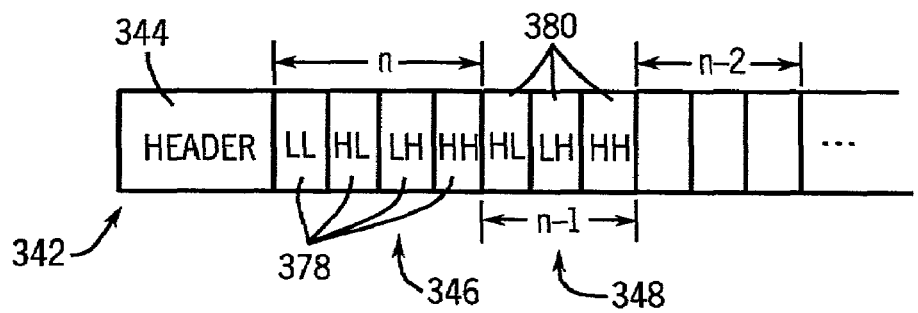
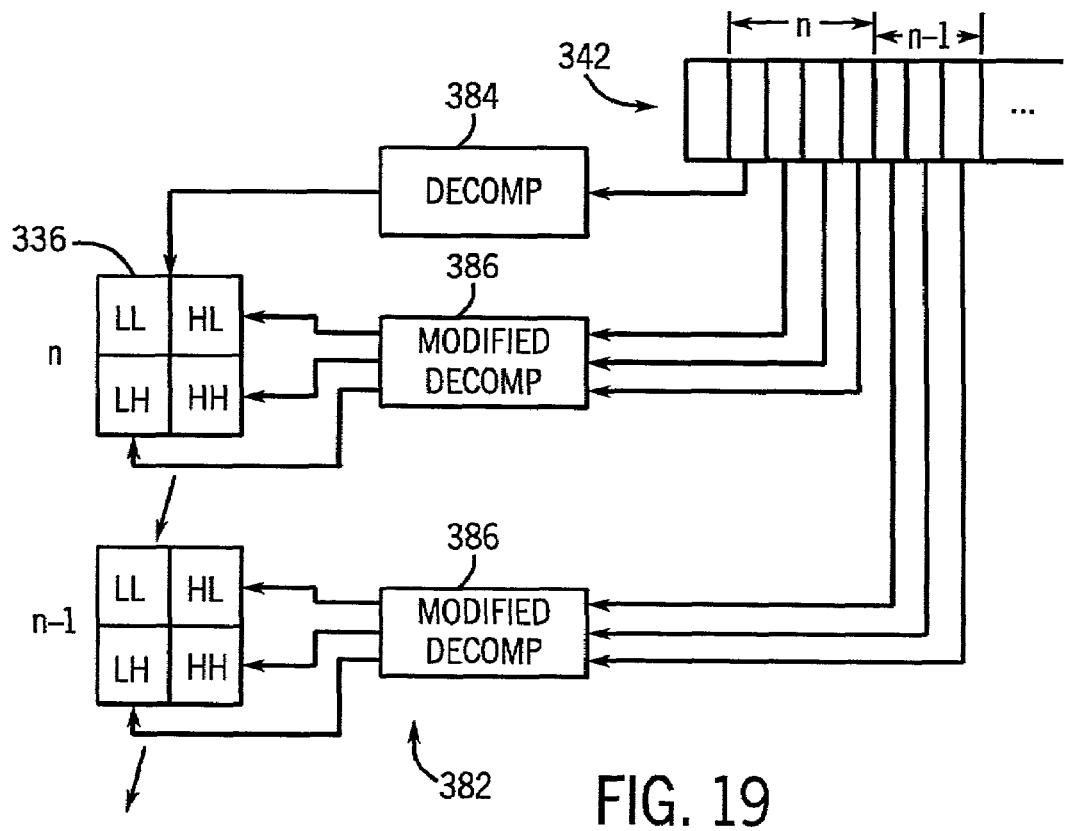
FIG. 19

| LEVEL | ROWS | COLS | COMPRESSED BYTES | EFF COMP RATIO |
|---|---|---|---|---|
| 5 | 64 | 79 | 5652 | 1811:1 |
| 4 | 128 | 157 | 13780 | 526:1 |
| 3 | 256 | 313 | 49868 | 147:1 |
| 2 | 512 | 625 | 186128 | 40:1 |
| 1 | 1024 | 1250 | 724560 | 10:1 |
| 0 | 2048 | 2500 | 2929860 | 2.6:1 |

FIG. 20

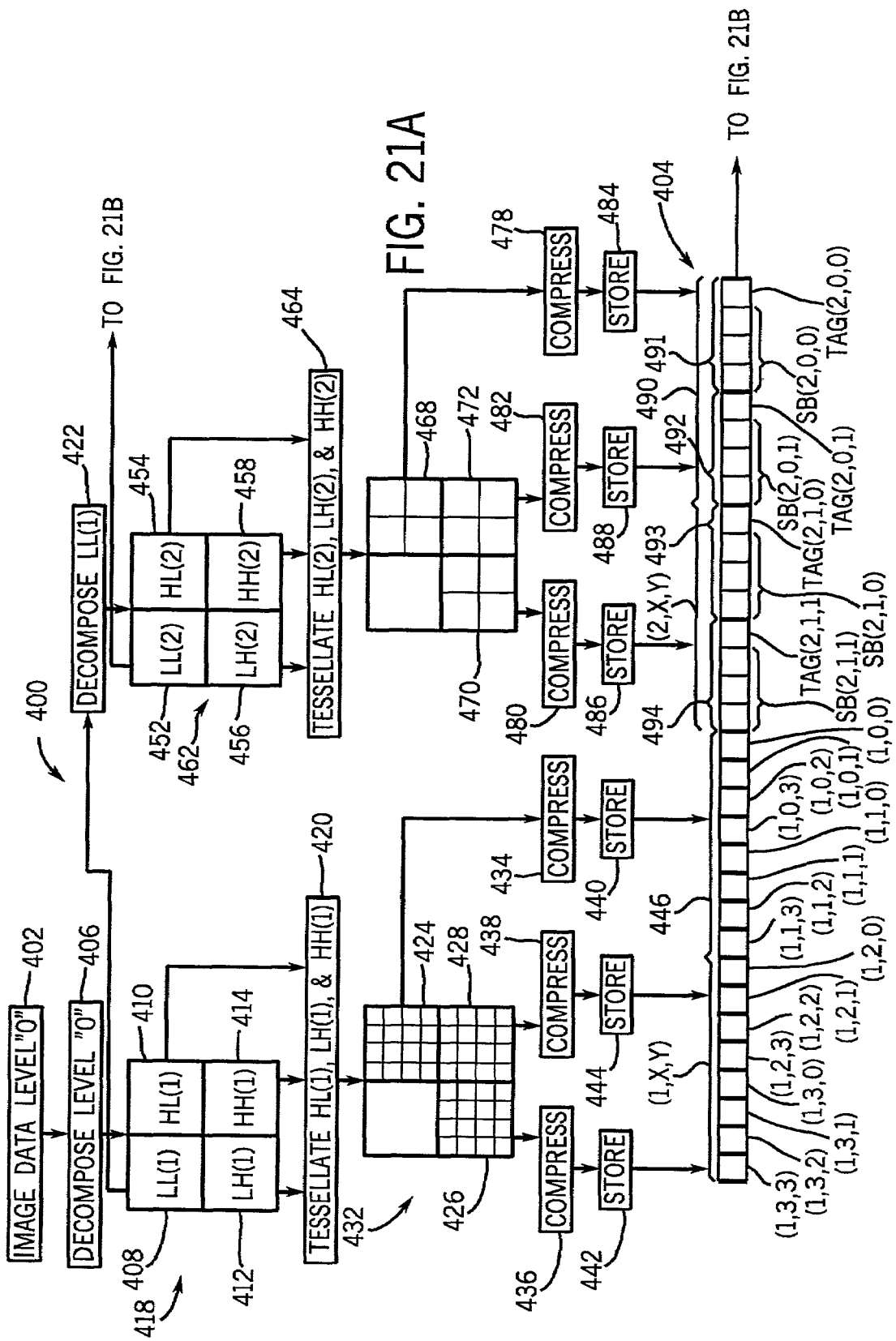

IMAGE TESSELLATION FOR REGION-SPECIFIC COEFFICIENT ACCESS

CROSS REFERENCE TO RELATED APPLICATIONS

The present is a Continuation-in-Part of patent application Ser. No. 09/716,603, filed Nov. 20, 2000 now U.S. Pat. No. 6,912,319, which is a Continuation-In-Part of patent application Ser. No. 09/448,950, filed on Nov. 24, 1999 now U.S. Pat. No. 6,633,674.

FIELD OF THE INVENTION

The present invention relates generally to the field of image data compression and handling. More particularly, the invention relates to a technique for addressing image data by image block indices for rapid transmission and selective handling of a desired area of interest.

BACKGROUND OF THE INVENTION

A wide range of applications exist for image data compression. Digitized images may be created in a variety of manners, such as via relatively simple digitizing equipment and digital camera, as well as by complex imaging systems, such as those used in medical diagnostic applications. Regardless of the environment in which the image data originates, the digital data descriptive of the images is stored for later reconstruction and display, and may be transmitted to various locations by networks, such as the Internet. Goals in digital image management include the efficient use of memory allocated for storage of the image data, as well as the efficient and rapid transmission of the image data for reconstruction. The latter goal is particularly important where large or complex images are to be handled over comparatively limited bandwidth networks. In the medical diagnostic imaging field, for example, very large image data sets may be available for transmission and viewing by a range of users, including those having limited access to very high bandwidths needed for rapid transmission of full detail images.

Picture archiving and communication systems, or PACS, have become an extremely important component in the management of digitized image data, particularly in the field of medical imaging. Such systems often function as central repositories of image data, receiving the data from various sources, such as medical imaging systems. The image data is stored and made available to radiologists, diagnosing and referring physicians, and other specialists via network links. Improvements in PACS have led to dramatic advances in the volumes of image data available, and have facilitated loading and transferring of voluminous data files both within institutions and between the central storage location or locations and remote clients.

A major challenge to further improvements in all image handling systems, from simple Internet browsers to PACS in medical diagnostic applications, is the handling of the large data files defining images. In the medical diagnostics field, depending upon the imaging modality, digitized data may be acquired and processed for a substantial number of images in a single examination, each image representing a large data set defining discrete picture elements or pixels of a reconstructed image. Computed Tomography (CT) imaging systems, for example, can produce numerous separate images along an anatomy of interest in a very short examination timeframe. Ideally, all such images are stored centrally on the PACS, and made available to the radiologist for review and diagnosis.

Various techniques have been proposed and are currently in use for analyzing and compressing large data files, such as medical image data files. Image data files typically include streams of data descriptive of image characteristics, typically of intensities or other characteristics of individual pixels in the reconstructed image. In the medical diagnostic field, these image files are typically created during an image acquisition or encoding sequence, such as in an x-ray system, a magnetic resonance imaging system, a computed tomography imaging system, and so forth. The image data is then processed, such as to adjust dynamic ranges, or to enhance certain features shown in the image, for storage, transmittal and display.

While image files may be stored in raw and processed formats, many image files are quite large, and would occupy considerable disc or storage space. The increasing complexity of imaging systems also has led to the creation of very large image files, typically including more data as a result of the useful dynamic range of the imaging system, the size of the matrix of image pixels, and the number of images acquired per examination.

In addition to occupying large segments of available memory, large image files can be difficult or time consuming to transmit from one location to another. In a typical medical imaging application, for example, a scanner or other imaging device will typically create raw data that may be at least partially processed at the scanner. The data is then transmitted to other image processing circuitry, typically including a programmed computer, where the image data is further processed and enhanced. Ultimately, the image data is stored either locally at the system, or in the PACS for later retrieval and analysis. In all of these data transmission steps, the large image data file must be accessed and transmitted from one device to another.

Current image handling techniques include compression of image data within the PACS environment to reduce the storage requirements and transmission times. Such compression techniques may, however, compress entire files, including descriptive header information that could be useful in accessing or correlating images for review. Moreover, current techniques do not offer sufficiently rapid compression and decompression of image files to satisfy increasing demands on system throughput rates and access times. Finally, alternative compression and decompression techniques do not offer the desired compression ratios, in combination with rapid compression and decompression in a client-server environment.

Another drawback of existing compression techniques is the storage, access and transmission of large data files even when a user cannot or does not desire to view the reconstructed image in all available detail. For example, in medical imaging, extremely detailed images may be acquired and stored, while a radiologist or physician who desires to view the images may not have a view port capable of displaying the image in the resolution in which they are stored. Thus, transmission of the entire images to a remote viewing station, in relatively time consuming operations, may not provide any real benefit and may slow reading or other use of the images.

There is a need, therefore, for an improved image data handling technique that provides for rapid transmission of image files and selective handling based on the desired region of interest.

SUMMARY OF THE INVENTION

The present technique responds to the foregoing needs by addressably handling image data, which is decomposed and tessellated into a plurality of tessellated sub-band blocks. The tessellated sub-band blocks may be addressed by an array of indices, which identify specific data blocks of the image data by decomposition level and spatial coordinates of the tessellated sub-band blocks. Accordingly, a desired region of the image data can be identified and individually handled for storage, transmission, retrieval, and display. The desired region also can be reference marked based on the array of indices.

BRIEF DESCRIPTION OF THE DRAWINGS

The foregoing and other advantages and features of the invention will become apparent upon reading the following detailed description and upon reference to the drawings in which:

FIGS. 7, 8, 9, 10, 11 and 12 are exemplary lookup tables in the form of compression code tables used to optimally compress subregions of image data in accordance with the present technique during the process illustrated in FIG. 6;

FIG. 14 is a process map illustrating progressive wavelet decomposition of image data in accordance with a further aspect of the present technique, permitting generation of a multiresolution compressed image data set;

FIG. 15 is a process map illustrating the progressive wavelet decomposition of FIG. 14 in conjunction with compression of the resulting data for compression of generation of the multiresolution compressed image data set;

FIG. 18 is a diagrammatical representation of an exemplary image data set including a header and blocks of compressed data in multiresolution compression;

FIG. 19 is a process map illustrating image data decompression and inverse wavelet transformation to obtain images of desired resolution;

FIG. 20 is a table indicating exemplary compression levels obtained via the present technique;

FIGS. 21A and 21B are block diagrams illustrating an exemplary addressable storage scheme for image data that has been decomposed, tessellated and compressed;

DETAILED DESCRIPTION OF SPECIFIC EMBODIMENTS

Figure 1:
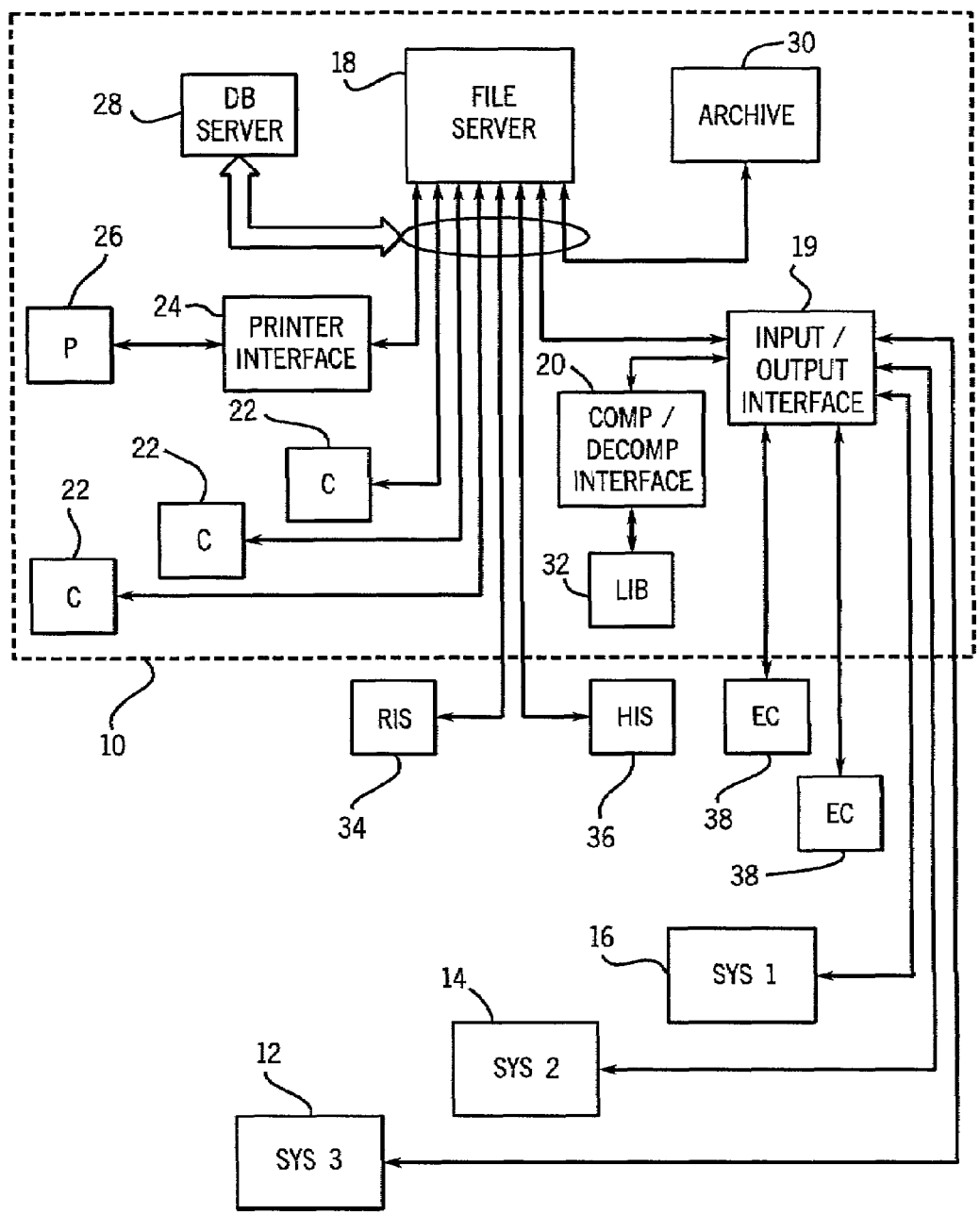
FIG. 1 is a diagrammatical representation of an exemplary image management system, in the illustrated example a picture archiving and communication system or PACS, for receiving and storing image data in accordance with certain aspects of the present technique.

FIG. 1 illustrates an exemplary image data management system in the form of a picture archive and communication system or PACS 10 for receiving, compressing and decompressing image data. In the illustrated embodiment, PACS 10 receives image data from several separate imaging systems designated by reference numerals 12, 14 and 16. As will be appreciated by those skilled in the art, the imaging systems may be of various type and modality, such as magnetic resonance imaging (MRI) systems, computed tomography (CT) systems, positron emission tomography (PET) systems, radio fluoroscopy (RF), computed radiography (CR), ultrasound systems, and so forth. Moreover, the systems may include processing stations or digitizing stations, such as equipment designed to provide digitized image data based upon existing film or hard copy images. It should also be noted that the systems supplying the image data to the PACS may be located locally with respect to the PACS, such as in the same institution or facility, or may be entirely remote from the PACS, such as in an outlying clinic or affiliated institution. In the latter case, the image data may be transmitted via any suitable network link, including open networks, proprietary networks, virtual private networks, and so forth.

PACS 10 includes one or more file servers 18 designed to receive and process image data, and to make the image data available for decompression and review. Server 18 receives the image data through an input/output interface 19. Image data may be compressed in routines accessed through a compression/decompression interface 20. As described more fully below, interface 20 serves to compress the incoming image data rapidly and optimally, while maintaining descriptive image data available for reference by server 18 and other components of the PACS. Where desired, interface 20 may also serve to decompress image data accessed through the server. The server is also coupled to internal clients, as indicated at reference numeral 22, each client typically including a work station at which a radiologist, physician, or clinician may access image data from the server, decompress the image data, and view or output the image data as desired. Clients 22 may also input information, such as dictation of a radiologist following review of examination sequences. Similarly, server 18 may be coupled to one or more interfaces, such as a printer interface 24 designed to access and decompress image data, and to output hard copy images via a printer 26 or other peripheral.

Server 28 may associate image data, and other workflow information within the PACS by reference to one or more file servers 18. In the presently contemplated embodiment, database server 28 may include cross-referenced information regarding specific image sequences, referring or diagnosing physician information, patient information, background information, work list cross-references, and so forth. The information within database server 28 serves to facilitate storage and association of the image data files with one another, and to allow requesting clients to rapidly and accurately access image data files stored within the system. Similarly, server 18 is coupled to one or more archives 30, such as an optical storage system, which serve as repositories of large volumes of image data for backup and archiving purposes. Techniques for transferring image data between server 18, and any memory associated with server 18 forming a short term storage system, and archive 30, may follow any suitable data management scheme, such as to archive image data following review and dictation by a radiologist, or after a sufficient time has lapsed since the receipt or review of the image files.

In the illustrated embodiment, other components of the PACS system or institution may be integrated with the foregoing components to further enhance the system functionality. For example, as illustrated in FIG. 1, a compression/decompression library 32 is coupled to interface 20 and serves to store compression routines, algorithms, look up tables, and so forth, for access by interface 20 (or other system components) upon execution of compression and decompression routines (i.e. to store various routines, software versions, code tables, and so forth). In practice, interface 20 may be part of library 32. Library 32 may also be coupled to other components of the system, such as client stations 22 or printer interface 24, serving similarly as a library or store for the compression and decompression routines and algorithms. Although illustrated as a separate component in FIG. 1, it should be understood that library 32 may be included in any suitable server or memory device, including within server 18. Moreover, code defining the compression and decompression processes described below may be loaded directly into interface 20 and/or library 32, or may be loaded or updated via network links, including wide area networks, open networks, and so forth.

Additional systems may be linked to the PACS, such as directly to server 28, or through interfaces such as interface 19. In the embodiment illustrated in FIG. 1, a radiology department information system or RIS 34 is linked to server 18 to facilitate exchanges of data, typically cross-referencing data within database server 28, and a central or departmental information system or database. Similarly, a hospital information system or HIS 36 may be coupled to server 28 to similarly exchange database information, workflow information, and so forth. Where desired, such systems may be interfaced through data exchange software, or may be partially or fully integrated with the PACS system to provide access to data between the PACS database and radiology department or hospital databases, or to provide a single cross-referencing database. Similarly, external clients, as designated at reference numeral 38, may be interfaced with the PACS to enable images to be viewed at remote locations. Such external clients may employ decompression software, or may receive image files already decompressed by interface 20. Again, links to such external clients may be made through any suitable connection, such as wide area networks, virtual private networks, and so forth.

Figure 2:
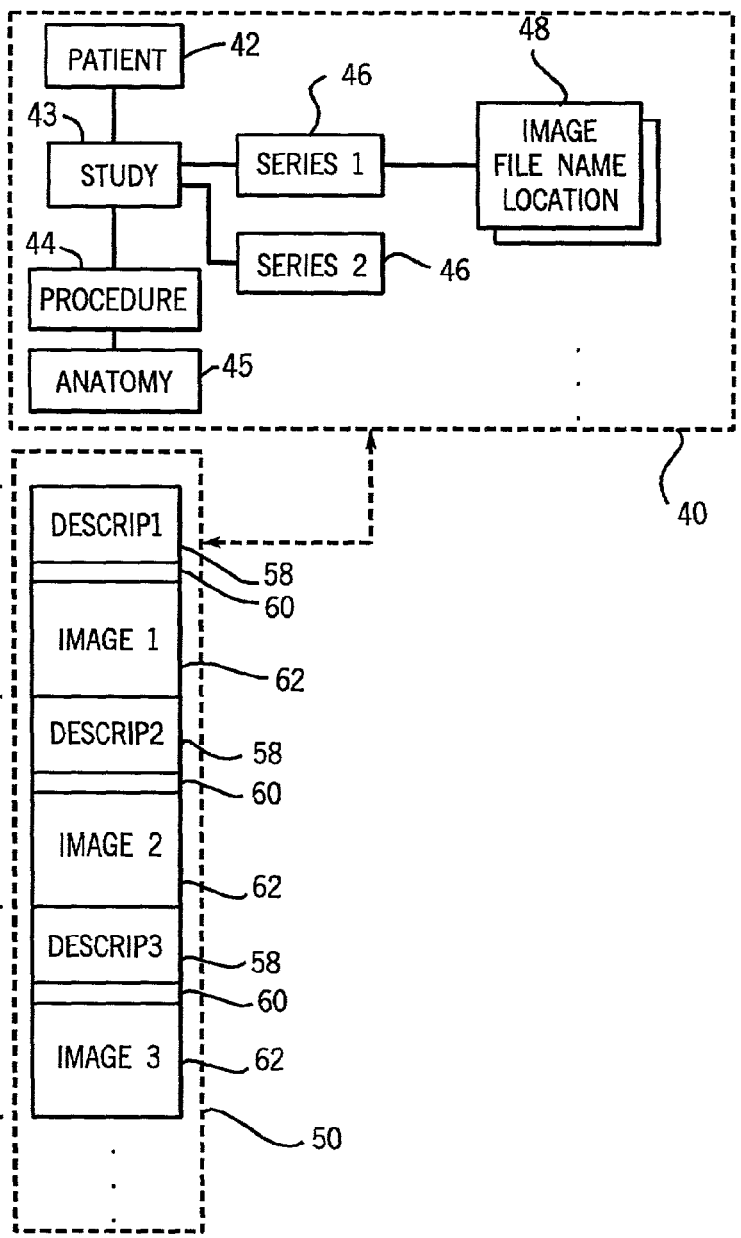
FIG. 2 is a diagrammatical representation of contents of a database for referencing stored image data in files containing multiple image data sets, compressed data, and descriptive information.

FIG. 2 illustrates in somewhat greater detail the type of cross-referencing data made available to clients 20, 22, 24, and 30 through database server 28. The database entries, designated generally by reference numeral 40 in FIG. 2, will include cross-referenced information, including patient data 42, references to specific studies or examinations 43, references to specific procedures performed 44, references to anatomy imaged 45, and further references to specific image series 46 within the study or examination. As will be appreciated by those skilled in the art, such cross-referenced information may include further information regarding the time and date of the examination and series, the name of diagnosing, referring, and other physicians, the hospital or department where the images are created, and so forth. The database will also include address information identifying specific images, file names, and locations of the images as indicated at reference numeral 48. Where the PACS includes various associated memory devices or short term storage systems, these locations may be cross-referenced within the database and may be essentially hidden from the end user, the image files simply being accessed by the system for viewing from the specific storage location based upon cross-referenced information in the database.

As described more fully below, in accordance with certain aspects of the present technique, descriptive information is used to identify preferred or optimal compression routines used to compress image data. Such descriptive information is typically available from header sections of an image data string, also as described in detail below. However, information available from database server 28 may also serve as the basis for certain of the selections of the algorithms employed in the compression technique. Specifically database references may be relied upon for identifying such descriptive information as the procedures performed in an imaging sequence, specific anatomies or other features viewable in reconstructed images based upon the data, and so forth. Such information may also be available from the RIS 34 and from the HIS 36.

FIG. 2 also illustrates an exemplary image file cross-referenced by the database entries. As shown in FIG. 2, image file 50 includes a plurality of image data sets 52, 54 and 56. In a typical image file, a large number of such image sets may be defined by a continuous data stream. Each data set may be compressed in accordance with specific compression algorithms, including the compression algorithms as described below.

Within each image data set, a descriptive header 58 is provided, along with a compression header 60. The headers 58 and 60 are followed by compressed image data 62. The descriptive header 58 of each data set preferably includes industry-standard or recognizable descriptive information, such as DICOM compliant descriptive data. As will be appreciated by those skilled in the art, such descriptive information will typically include an identification of the patient, image, date of the study or series, modality of the system creating the image data, as well as additional information regarding specific anatomies or features visible in the reconstructed images. As described more fully below, such descriptive header data is preferably employed in the present technique for identification of optimal compression algorithms or routines used to compress the data within the compressed image data section 62. Data referring to the specific algorithm or routine used to compress the image data is then stored within compression header 60 for later reference in decompressing the image data. As described below, additional data is stored within the compressed image data, cross-referencing the algorithms identified in compression header 60 for use in decompressing the image data. Specifically, in a presently preferred embodiment, the compression header 60 includes identification of the length of subregions of the compressed image data, as well as references to specific optimal algorithms, in the form of compression code tables used to compress the subregions optimally.

Figure 3:
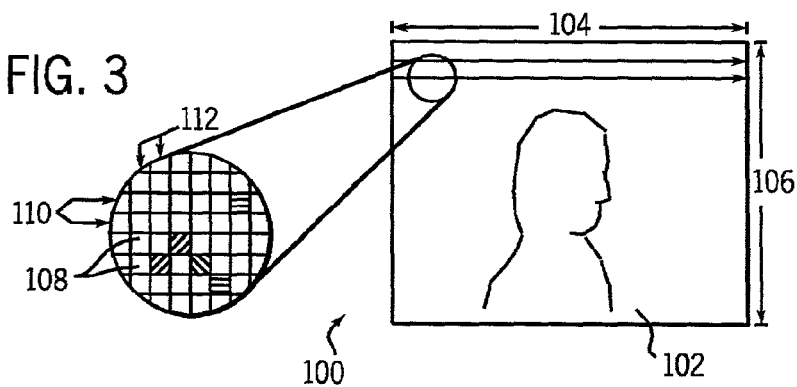
FIG. 3 is a representation of a typical image of the type received, compressed, and stored on the system of FIG. 1.

FIG. 3 illustrates a typical image that is encoded by packets of digitized data assembled in a continuous data stream, which may be compressed and decompressed in the present techniques. The image, designated generally by the reference numeral 100, will typically include features of interest 102, such as specific anatomical features. In medical diagnostic applications, such features may include specific anatomies or regions of a patient viewable by virtue of the physics of the image acquisition modality, such as soft tissue in MRI system images, bone in x-ray images, and so forth. Each image is comprised of a matrix having a width 104 and a height 106 defined by the number and distribution of individual pixels 108. The pixels of the image matrix are arranged in rows 110 and columns 112, and will have varying characteristics which, when viewed in the reconstructed image, define the features of interest. In a typical medical diagnostic application, these characteristics will include gray level intensity or color. In the digitized data stream, each pixel is represented by binary code, with the binary code being appended to the descriptive header to aid in identification of the image and in its association with other images of a study. As noted above, such descriptive information may include industry standard information, such as DICOM compliant data.

Figure 4:
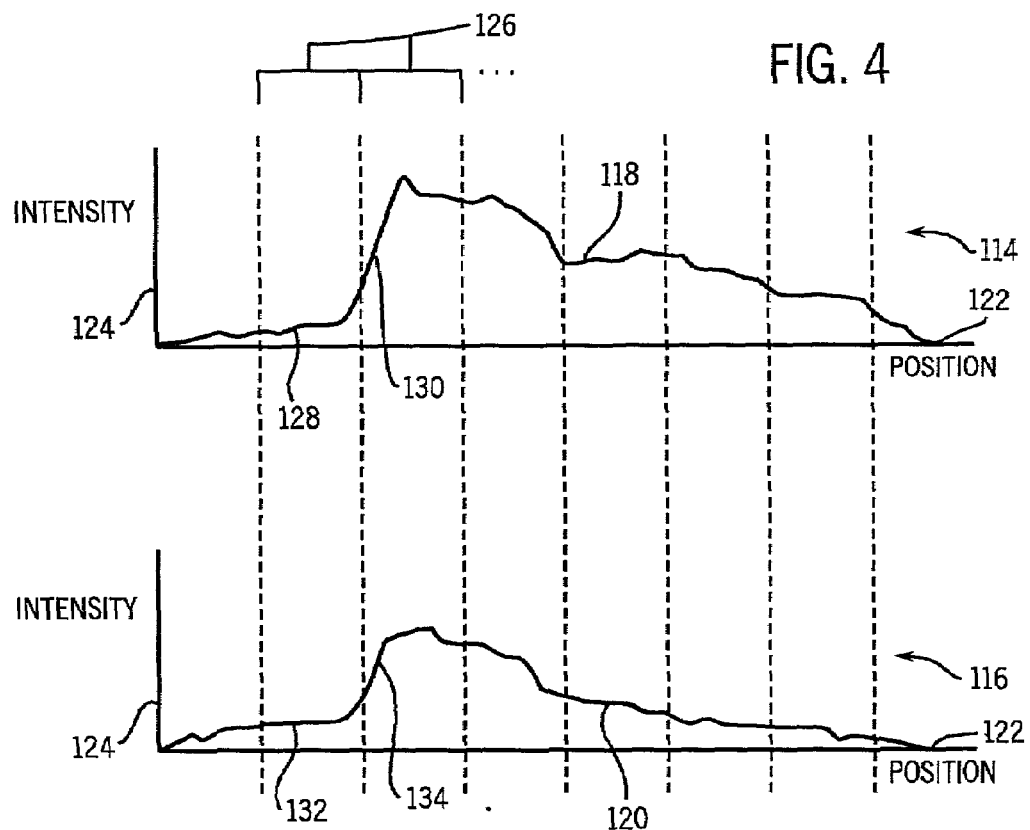
FIG. 4 is a graphical representation of intensities of pixelated data across an image, subdivided into subregions for compression of the subregions optimally based upon characteristics of the subregions.

FIG. 4 graphically represents intensities of pixel data defining an image across a pair of rows of the image matrix. Each row of the image matrix will include a series of pixels, each pixel being encoded by binary data descriptive of the pixel characteristics, typically intensity. Thus, lighter regions of the reconstructed image will correspond to pixels having a higher intensity level, with darker regions having a lower intensity level. When illustrated graphically, the intensity levels of the pixels across the image may form a contour or trace as shown in FIG. 4. Specifically, FIG. 4 illustrates a first row 114 lying adjacent to a second row 116, each row including a series of pixels having various intensities as indicated by traces 118 and 120, respectively. As will be appreciated by those skilled in the art, in practice, the graph of the pixel intensities would form a step-wise function along the position axis 122 and having amplitudes varying along the intensity axis 124.

It may be noted from FIG. 4 that in an actual image, variations in intensity along rows, and along columns as represented by correspondingly located intensities moving downwardly or upwardly through adjacent rows, will vary in accordance with the features represented in the reconstructed image. As illustrated in FIG. 4, row 114 includes areas of rising and declining intensity, including areas of both low intensity and high intensity. Row 116 includes areas of similar intensity, but varying by virtue of the features represented in the image. In accordance with the present technique, the image data stream is reduced to subregions as represented generally by reference numeral 126 in FIG. 4. While the subregions may be of different lengths (i.e. numbers of pixels), in the presently preferred embodiment, each subregion includes data encoding an equal number of pixels. Those skilled in the art will readily recognize, however, that after compression the actual length of codes for the subregion will vary depending upon the intensity of the pixels within the subregion and the dynamic range of the digital data encoding the pixel intensities. It should also be noted that where the row length of the image matrix is an integer multiple of the subregion width, individual subregions will align with one another moving down the image matrix as represented in FIG. 4. In general, however, the present technique is not limited to such integer multiple row widths.

Each subregion of the image data stream may be analyzed to identify entropy levels of the image data for compression purposes. In general, the entropy of the image data refers to the relative variation in the pixel intensities within each subregion. Thus, although a specific subregion may include pixels of a high intensity or a low intensity, where the intensity level is relatively stable or constant in the subregion, entropy is considered to be low. Such regions are shown in FIG. 4, for example, in portions of traces 114 and 116 indicated by reference numerals 128 and 132, respectively. On the contrary, where substantial variations in pixel intensity are encoded by the subregion data, the entropy level is considered high. Such regions are shown in FIG. 4 at reference numerals 130 and 134. It has been found that by subdividing the image data stream into subregions, which may have various lengths depending upon the image characteristics, and by analyzing the relative entropy level of each subregion, the subregions may be optimally compressed in accordance with one of several candidate compression algorithms. Specifically, the present technique employs a series of predefined compression code tables, which serve to translate pixel prediction errors into compressed codes for each subregion. The specific compression code table selected for each subregion is a function of the entropy identified for the subregion in the compression routine.

Figure 5:
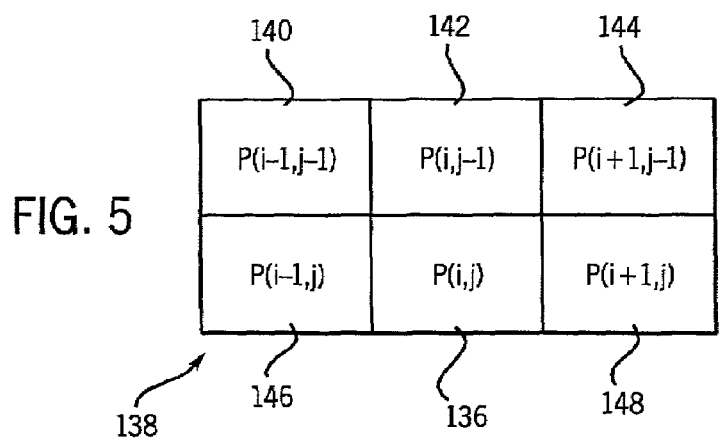
FIG. 5 is a diagrammatical representation of a pixel neighborhood used in the analysis of the image data for compression purposes.

As will be described more fully below, the present technique preferably employs pixel value predictors and identifies differences between predicted values of individual pixels (i.e. binary code for the pixel intensity or other characteristic) and the actual value for the respective pixels. In fact, several predictor algorithms may be employed, with the specific predictor being identified based upon image characteristics, such as characteristics encoded in a descriptive header for the image data stream. The predictors are based upon comparisons of target pixels, or pixels of interest, with neighboring pixels. FIG. 5 represents a pixel neighborhood that serves as the basis for references made in the predictor algorithms. The pixel neighborhood, identified by reference numeral 138 in FIG. 5, includes the pixel of interest 136, designated p(i, j). Neighboring pixels include a "northwest" pixel 140, designated p(i−1, j−1), a "north" pixel 142 designated p(i, j−1), a "northeast" pixel 144 designated p(i+1, j−1), and a "west" pixel 146 designated p(i−1, j). Some or all of these pixels may be employed in the predictor algorithm, or other additional pixels may be provided in a larger neighborhood.

Figure 6:
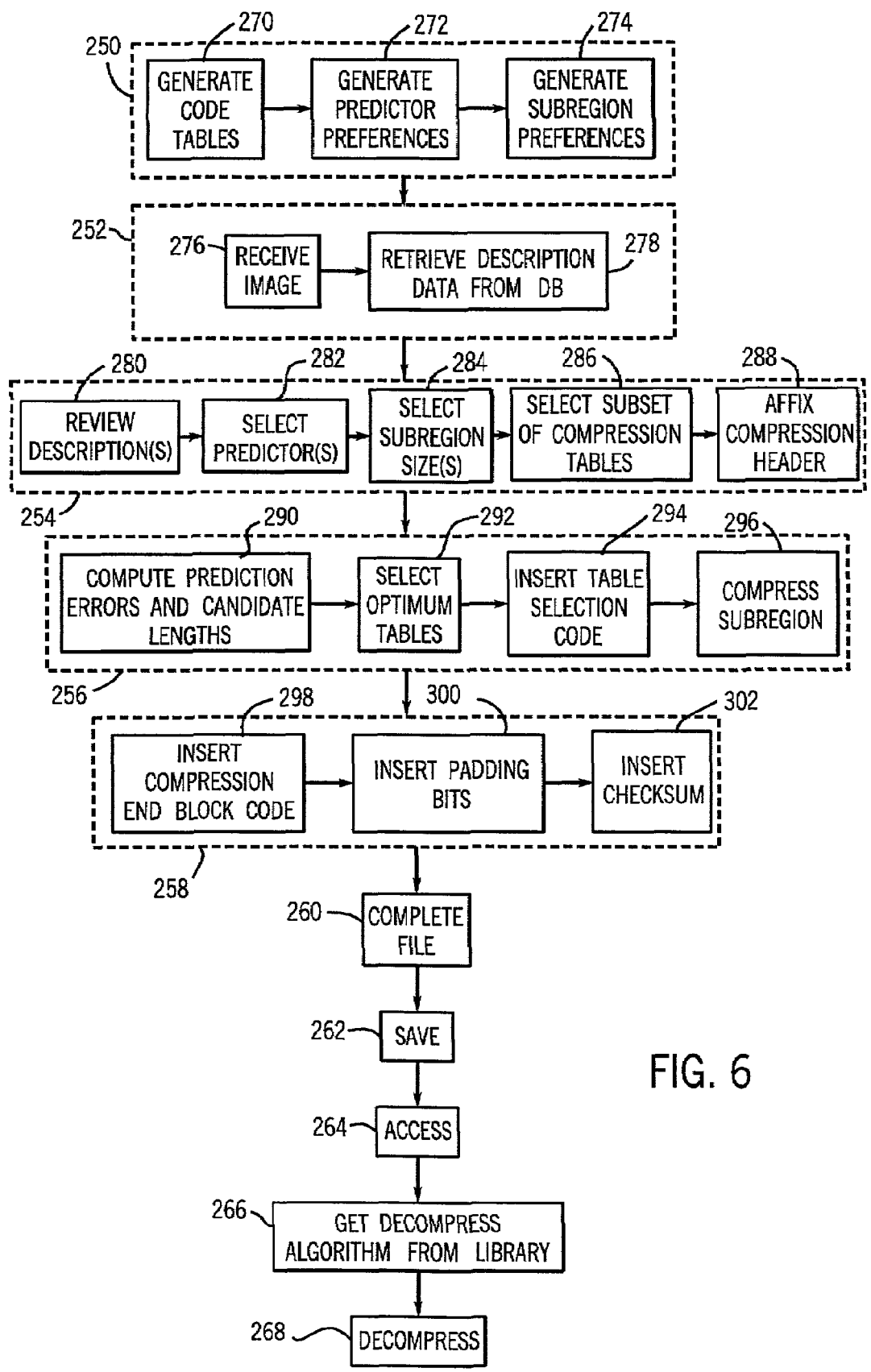
FIG. 6 is a flow chart illustrating exemplary control logic for compressing and decompressing image data in accordance with aspects of the present technique.

The preferred technique for compressing the image data stream in the system described above to create hybrid compressed image data files is summarized in FIG. 6. The control logic may be subdivided into a series of logical blocks or segments, including a configuration segment 250 in which optimal compression algorithms, tables, predictor preferences, block or subregion length preferences, and so forth, are established. In a data access and retrieval segment 252, the image data to be compressed is received, as is descriptive information from database server 28, if used. In an evaluation segment 254 the images are evaluated based upon the algorithms and preferences established in configuration segment 250. In a compression segment 256, certain values are computed and selected for the compression routine, and the image data is compressed to create the resulting compressed file.

File code is added to the compressed data in a final segment 258. The file is then completed at step 260 and stored at step 262. The compression and decompression logic is then completed by eventual access of the compressed image file at step 264, retrieval of a decompression algorithm or algorithms at step 266 and decompression at step 268 for viewing and output. The foregoing logical segments and processes will be described below in greater detail.

The configuration segment 250 of the control logic includes steps of configuring the specific compression, predictor and block or subregion algorithms employed in the routine. Thus, at step 270 a series of compression code tables are generated for optimally compressing subregions of image data based upon relative entropy levels as indicated by prediction errors. As will be appreciated by those skilled in the art, such compression code tables serve to cross-reference original values with compressed values, generally in accordance with anticipated distributions or frequencies of occurrence of the original values. In the presently preferred embodiment, a series of compression code tables are established based upon analysis of typical images to be compressed by the routine. While the specific coding and ranges implemented in the compression code tables vary, and will generally be determined in specific applications empirically, examples of several such compression code tables are illustrated in FIGS. 7-12.

Referring to FIGS. 7-12, each compression code table, such as table 170 in FIG. 7, comprises a series of compressed data values 172 cross-referenced to original image parameters 174. In the example illustrated in the FIGS. , analysis may include an indication of the resulting code links in bits, as indicated by reference numeral 176, and the span of code translated by each table entry, as indicated by reference numeral 178. In the illustrated embodiment, the compressed data code of column 172 translates difference values of column 174 as identified by application of predictors in the compression routine, followed by determination of the differences between the predicted and actual values. Thus, by way of example, where a difference value of 1 is identified based upon a predictor algorithm as described below, table 170 provides a compressed data code of 100. Again, it should be noted that the difference value does not generally represent the value of the encoded pixel itself, but a difference between a predicted value and an actual value. Thus, in a code length of 3 bits, summarized in column 176 of table 170, the pixel of interest differing from the predicted value by 1 will obtain a compressed data value of 100, although the pixel value itself may be considerably longer. As also may be seen in FIG. 7, the compressed data codes provided in column 172 may be summarized as including a first portion 180 designating the level within the table, followed by a second portion 182 which indicates the position within the level or range. Thus, for example, in the case of the table of FIG. 7, a difference range of from −2 to −3 would be encoded as 1101 followed by an additional bit set to a value of 0 or 1 depending upon whether the difference is −2 or −3. At an upper limit of the range, the compressed data code is taken to be the actual value of the individual pixel as described below with reference to FIG. 13.

As can be seen from the FIGS. 7-12, the compression code tables for translating prediction errors or differences to compressed code are established to provide a range of coding appropriate to the levels or variations in the difference values for each subregion of the data stream. Specifically, table 170 of FIG. 7 is adapted to a lowest entropy level as indicated by the low difference variation (zero) accommodated by the shortest code in the table and the relatively fine steps between the difference levels. FIG. 8 represents a second compression code table 184 providing for relatively higher entropy as indicated by the relatively broader maximum levels accommodated by the table and the relatively higher difference ranges as compared to table 170 of FIG. 7. FIGS. 9, 10, 11 and 12 provide additional examples of compression code tables 186, 188, 190 and 192, respectively, for encoding successively higher entropy levels as indicated by prediction errors or differences within the various subregions. In the present embodiment illustrated, the code tables are constructed using a Huffman code-based prefix and a multibit extension.

It should be noted that the compression ratio provided by each of the compression code tables in the family of tables varies depending upon the relative entropy level to be accommodated. Thus, table 170 of FIG. 7 provides a relatively high maximum compression ratio of 16:1, while table 192 of FIG. 12 provides a lower maximum compression ratio of 2.29:1. However, it has been found that the use of a plurality of different compression code tables to accommodate the different entropies of the data stream subregions results in excellent compression due to the use of compressed data code lengths optimally selected to accommodate the variations in prediction differences for the subregions.

It has been found that for specific types of images or for images having specific typical characteristics, various entropy levels may be anticipated. For example, in medical diagnostic imaging, relatively high entropy levels may be expected for specific modalities, such as CT and MRI data. Other imaging modalities may provide images with relatively lower variations in the image intensity levels, reflected by lower entropy values and correspondingly lower prediction differences. Moreover, it has been found that specific image types may provide higher or lower characteristic entropy values. In the medical diagnostics field, such image types may include specific anatomies, such as chest, head, extremities, and so forth, providing more or less variation, and stronger or weaker edge lines and contrast. The specific family of compression code tables, then, are preferably established based upon the typical images to be compressed by the system.

Returning to FIG. 6, with the family of compression code tables generated and stored at step 270, configuration segment 250 continues with generation of predictor preferences as indicated at step 272. As described above, rather than employ actual pixel intensity values for encoding in the present compression technique, difference values may be employed based upon the predictor algorithms. The predictor algorithms generally produce relatively low values in low entropy regions of the image, and relatively higher values in higher entropy regions. However, the use of prediction errors for the data compression will generally result in compression of values that are lower (i.e. shorter in length) than the original data stream code values due to the relatively gradual progression of intensity variations over the image.

In the presently preferred embodiment, one or more of several predictor algorithms may be employed. Referring again to FIG. 5, in a simple and straightforward algorithm, the value of each pixel $p(i, j)$ is predicted to be the value of the immediately preceding pixel $p(i-1, j)$. This predictor algorithm provides a computationally extremely efficient tool for the prediction of each pixel value, with the first pixel in the image being estimated at a value of zero. The difference value is then generated by finding the absolute value of the difference between the predicted value and the actual value for the pixel of interest. The resulting difference values form a matrix of equal size to the original image matrix.

Several alternative predictor algorithms are presently contemplated, and others may be employed as well. In the presently preferred embodiment, these predictor algorithms may be summarized as follows:

$$Ip(i,j)=Ip(i-1,j) \quad (P1);$$

$$Ip(i,j)=Ip(i-1,j)+Ip(i,j-1)-Ip(i-1,j-1) \quad (P2);$$

$$Ip(i,j)=((3*(Ip(i-1,j))+Ip(i-1,j-1)+Ip(i,j-1)+Ip(i+1,j-1))/6 \quad (P3);$$

$$Ip(i,j)=((-2*I(i-1,j-1))+(3*Ip(i,j-1))+(3*Ip(i-1,j)))/4 \quad (P4);$$

$$Ip(i,j)=((-5*I(i-1,j-1))+(7*Ip(i,j-1))+Ip(i+1,j-1)+(9*Ip(i-1,j)))/12 \quad (P5);$$

$$Ip(i,j)=Ip(i,j-1)+Ip(i-1,j))/2 \quad (P6);$$

where the notation "I" represents the pixel intensity, and the individual pixel designations are mapped in accordance with FIG. 5.

Again, it has been found that various predictors are particularly useful for various types of images, images resulting from various modalities, and various features or anatomies visible in the reconstructed image. For example, the predictor algorithm P1 provides an extremely simple and rapid "last value" estimate of each current pixel value. Predictor P2 provides some degree of edge detection capability, but may accentuate the influence of noise in the image. The third predictor value P3 is a linear predictor shown useful on certain image types and employs values for more of the surrounding pixels, weighting the last value more heavily. In practice, the predictor preferences generated at step 272 of FIG. 6 will follow empirical results for various image types and modalities.

The final step illustrated in segment 250 of the control logic of FIG. 6 is the generation of subregion preferences for the division of the image data stream into subregions. As indicated above, while the lengths of subregions of the image data stream may be different or may vary depending upon such factors as the entropy level, in the presently preferred configuration, the subregion lengths are set equal to one another, but may vary depending upon such factors as the modality originating the image data, the image type, anatomy illustrated in the reconstructed image, and so forth. For example, subregion lengths of 32 pixels are presently set to a default, but alternative subregion lengths of 8, 16, 24, or more than 32 pixels, are contemplated. In general, the preferences set at step 274 in the present embodiment are dependent upon the number of columns in the image matrix, with subregion lengths of 8 being used for matrices having 64 columns or less, subregion lengths of 16 being used for matrices having 128 columns or less, and so forth. To reduce the computational complexity and to improve speed, in the presently preferred embodiment, the subregions are taken along the major direction or axis (i.e. rows or columns) of the image matrix, depending upon the direction in which the data is stored. Also, the subregions are preferably one-dimensional only.

With the compression algorithms, tables, predictor preferences, and subregion size preferences set, the control logic illustrated in FIG. 6 advances through segment 252. In that segment of the logic, the image data is received as indicated at step 276. As noted above, the image data may be directly received from an external source, or may be accessed from a memory within the PACS itself. At step 278, any descriptive information used to select algorithms or parameters of the compression routine are retrieved from the database server. As noted above, such descriptive information may be stored in databases, and may complement the information contained within the descriptive header of the image data stream.

Following segment 252, control advances to evaluation segment 254. Within this segment, the image data is reviewed for descriptive information as indicated at step 280. As described above, where descriptive information is available, such as DICOM compliant data in a descriptive header section of the image data stream or descriptive data from the database, some or all of this data is reviewed at step 280. Based upon the preferences set in the configuration segment 272, predictors are selected at step 282 depending upon the image characteristics identified at step 280. Again, these may include the modality of the originating imaging system, the study type or anatomy featured in the image, the number of columns in the image, the number of rows, and so forth. Moreover, other factors may be considered in selecting the predictors at step 282, such as the computational efficiency desired, the processing power of the system, and so forth, with computationally efficient predictors being selected where such processor capabilities are limited, or where additional speed is desired. At step 284, the subregion size for division of the image data stream into subregions is selected in accordance with the preferences established at step 274. Again, step 284 may consist of a default selection, which may be altered depending upon some or all of the characteristics or factors considered for selection of the predictors.

Evaluation segment 254 continues with the selection of a subset of compression tables, where appropriate, as indicated at step 286. In particular, based upon certain image characteristics, it may be useful to preselect certain compression tables as defaults. For example, specific image types originating in specific modalities, such as CT or MR images, may be best compressed with specific candidate tables that may be selected at step 286. At step 288, a compression header is affixed to the image data. As described below, this compression header will contain code identifying the version of the compression routine, the predictors selected at step 282, the subregion sizes selected at step 284, and so forth.

At compression segment 256 of the control logic, a set of prediction errors or difference values are computed at step 290. As noted above, these values are based upon application of one or more of the predictor algorithms selected at step 282, and by subsequently comparing the predicted values with the actual values for each pixel to determine the prediction error or difference. The resulting prediction errors then form a data stream with the first pixel being assigned its actual value, followed by the difference values for each pixel of the subregion.

The present technique provides for optimal compression of each of the subregions based upon appropriate selection of tables from the family of compression code tables established at step 270. To determine which tables provide best compression, at step 290 of the control logic of FIG. 6, candidate lengths of compressed data are computed by application of each of the candidate compression code tables to the data resulting from application of the predictor algorithms. The total data stream length for each subregion is summed for each case (i.e. application of each of the compression code tables). Following completion of each subregion, the resulting sums are compared to identify which compression code table results in the shortest data stream for the subregion. The corresponding compression code table is then selected as indicated at step 292. At step 294, code identifying the selected table for each subregion is then inserted into the compressed data and its header, as described in greater detail below.

As noted above, evaluation segment 254 or compression segment 256 may include defaults and constraints on the selection of the optimal code tables. For example, depending upon such factors as the bit depth of the image data to be encoded, certain default selections among the compression code tables may be made, such as selection of the first four tables for bit depths of 8 or less. In addition, certain preferences for designated compression code tables may be made in this selection process, depending upon such factors as the modality originating the image data. By way of example, CT and MRI data may tend to encode higher transitions of pixel intensities, corresponding to higher entropy regions. Accordingly, preferences may be included in the selection of the compression code tables, depending upon the descriptive data reviewed at step 280, such as to prefer one or more higher entropy tables for images originating in such modalities. Finally, in the presently preferred embodiment, code will be inserted directly into the compressed data stream to provide an indication of which of the selected tables is employed for compressing the individual subregions. To optimize the compression, it may be desirable to limit the number of tables which may be selected in the preprocess segment of the control logic to a number which may be conveniently coded in a limited number of bits, such as 2 bits of data. Thus, where table identification codes are to be provided in 2 bits, a constraint may be imposed in the preprocess segment such that only four of the candidate tables may be selected for the compression. Where an additional bit is available for identification of the tables, 8 candidate tables may be selected and encoded.

At step 294 key code for the subregion compression is inserted into the compressed data stream, immediately preceding the compressed subregion data. As noted above, where four candidate tables are employed for the compression, the code inserted at step 294 may include a pair of designated bits. The compression header created at step 288 cross-references this key code to the selected compression tables. At step 296, the image data for the subregion is compressed by application of the selected compression code table. The series of steps of segment 256 is repeated for each subregion of the image until the entire image is compressed.

In final segment 258, the compressed data for each image is completed. Specifically, at step 298, a compression end block is added to the compressed data. At step 300, padding bits are inserted following the compression end block. Finally, at step 302 a checksum value computed through the compression process is added to the compressed data to provide a means for verifying proper decompression. The position and type of code added to the compressed data during segment 258 is described more fully below with reference to FIG. 13.

Where a descriptive header is provided for the original image data, the descriptive header is preferably replaced adjacent to the compression header to complete the image file as indicated at step 260. It will be noted that the resulting data file is a hybrid compressed data file in which the descriptive header data is readable for image management, access, transmission, and similar purposes, while the bulk of the image data is optimally compressed as described above. At step 262, the resulting file is saved, typically in a short-term storage system, or in an archive. At step 264, the image is accessed for reviewing, analysis, hard copy creation, and so forth. Upon access of the image, the decompression algorithms identified in the hybrid compressed data file are retrieved for decompression, and the compressed image data is decompressed, as indicated at step 266. This decompression follows the compression header information, with the same compression code tables being employed to decompress the data as were employed to compress it for each subregion. This application of the compression code tables results in identification of the prediction errors or differences on which the compression was based, and the specific predictor algorithm or algorithms employed to generate the differences are then used to regenerate the original image data in a lossless fashion.

Figure 13:
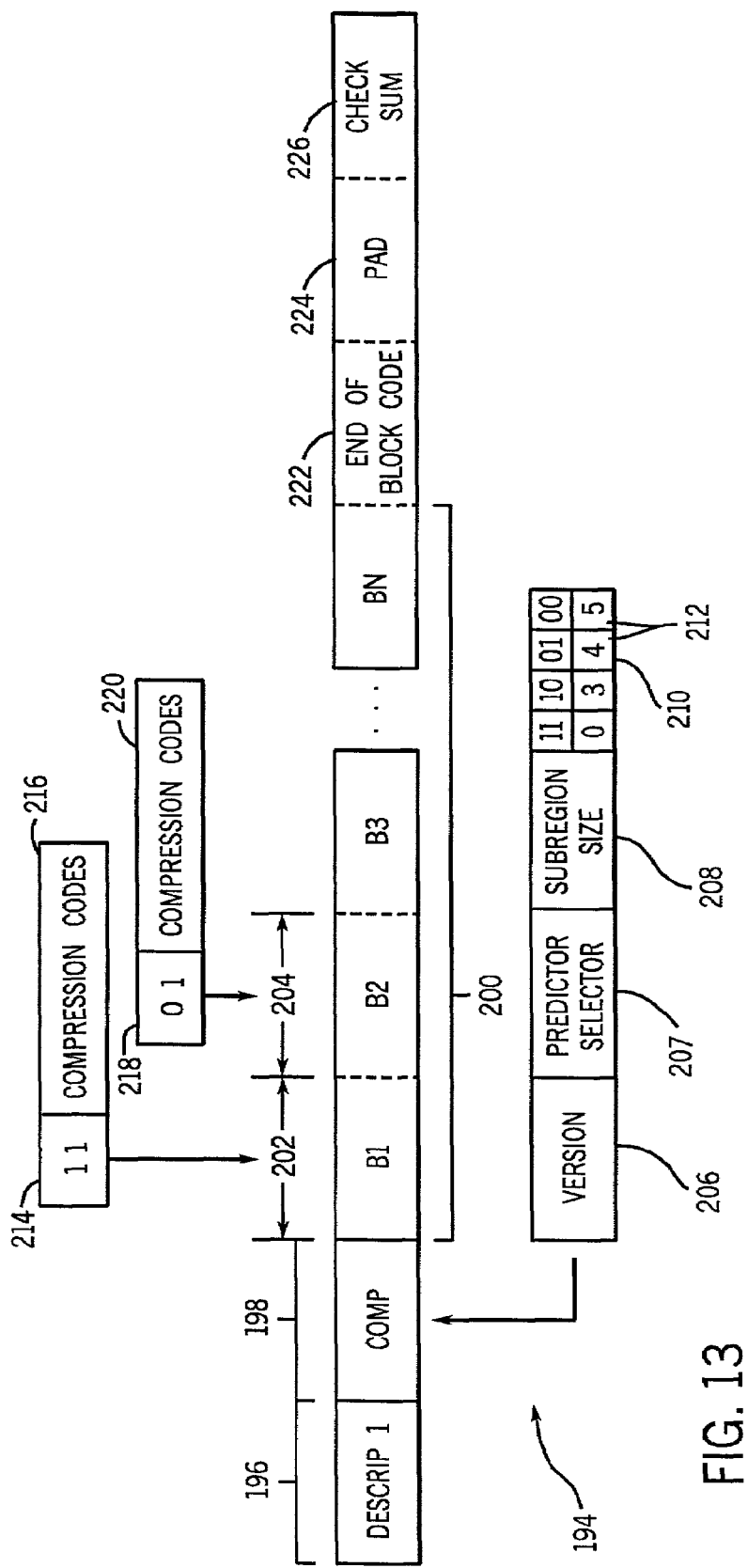
FIG. 13 is a diagrammatical representation of an exemplary image data set, including a descriptive header, a compression header, and blocks of compressed data by subregion.

FIG. 13 represents an image data set compressed in accordance with the foregoing technique. The image data set, designated generally by the reference numeral 194, includes the descriptive header 196 appended at step 160, along with the compression header 198 affixed at step 192. Following the compression header 198 is the compressed image data 200, which includes compressed image subregions 202, 204 and so forth. Each compressed data subregion, in turn, includes an identification of the algorithm or algorithms (e.g. compression code tables) used to encode the subregion, followed by the actual compressed data.

FIG. 13 also illustrates a presently contemplated format for a compression header 198. As shown in FIG. 13, the compression header includes an identification of the compression routine version 206, followed by an identification of the predictors used in the compression process 207, and identification of the subregion length at reference numeral 208. A compression algorithm identification segment 210 is then inserted in the compression header to identify which of the compression algorithms (e.g. compression code tables) were selected for the compression, and the manner in which each table is encoded in the data stream for each subregion. In the example of FIG. 13, for example, tables 0, 3, 4 and 5 were selected, as indicated at reference numeral 212, with each table being identified by a 2 bit binary code to be found within the first 2 bits of the compressed data for each subregion.

FIG. 13 also illustrates the format in the presently preferred embodiment for the compressed data code for each image subregion 202, 204, and so forth. In the illustrated embodiment, a first portion of each subregion includes an identification of the compression table used to compress the subregion data, as indicated at reference numeral 214 for subregion 202, and reference numeral 218 for subregion 204. This key code is followed by the compression codes as indicated at reference numerals 216 and 220, respectively. Finally, FIG. 13 illustrates the code inserted at the end of each compressed image file, or portion of a file. Specifically, following the last subregion BN of the image, the end of block code portion 222 is affixed. As noted above, this end of block code signals the end of an image, or may be used to signal the end of a portion of an image, where the data compression routine is changed within a single image, such as due to large variations in the image data entropy. The padding code is inserted as indicated at reference numeral 224. This code may be of variable size as needed to complete the compressed data file on a whole word length. Finally, a 32-bit checksum portion 226 is added to complete the compressed data.

The foregoing aspects of the present technique may be adapted in various manners depending upon the type of image to be compressed. For example, the technique may be used on both images composed of varying gray levels, as well as on color images. As will be appreciated by those skilled in the art, color images will typically consist of various color components, which produce the appearance of color variations due to their respective intensities. The foregoing technique may be used either with or without separating the color components from one another, but is preferably applied by separating the color components and processing (i.e. compressing) the components in groups. Similarly, multiframe images may be accommodated in the present technique. As will be appreciated by those skilled in the art, such images typically comprise a number of separate images encoded by rows and columns, without separate descriptive headers (e.g. DICOM compliant headers) positioned between the separate images. In such cases, code identifying offsets in the compressed data corresponding to locations of different image frames is preferably inserted into the descriptive header of the hybrid compressed data file.

It has been found that the foregoing image data compression and decompression technique can be further refined to provide for multiresolution (or multi-size) image data compression to further enhance rates of data transfer and decompression. Where a user does not desire to view a fill image with maximum resolution, or where the user view port is limited, such multiresolution image compression facilitates transfer of a reduced size image to the user for viewing, with excellent image quality. Moreover, as described below, the multiresolution image compression aspect of the present technique allows a user to view a reduced size or reduced resolution image relatively rapidly, and to "zoom" on the image thereafter by transfer of only a portion of the compressed data corresponding to components of the greater sized image not already transferred. The additional data is then processed and combined with the reduced size image data to obtain the larger sized image.

The present multiresolution implementation is based upon lossless integer wavelet decomposition in combination with optimized Huffman code compression as described above, and modification of the Huffman code compression based on a recognition of the nature of high frequency data sets from the wavelet decomposition. Specifically, as will be recognized by those skilled in the art, wavelet decomposition involves a dyadic filtering and sub-sampling process. This creates a hierarchical set of sub-bands, as illustrated in FIG. 14. As illustrated in FIG. 14, an image data set 300 includes low frequency components 302 along with high frequency components 304, which may be considered as noise or variations from the low frequency components. A single level wavelet decomposition results in a decomposed data set 306 which includes one low frequency sub-band LL, designated by reference numeral 308 in FIG. 14, along with three high frequency ones LH, HL, and HH, designated by reference numerals 310, 312 and 314. Subsequent decomposition may be considered to produce a further data set 316 in which the low frequency sub-band is further decomposed into a set 318 of sub-bands, including a low frequency band 320, along with three additional high frequency sub-bands 322, 324 and 326.

Typically, wavelet transforms are real (floating point) filters with the result also being real values. Until recently, only the S-Transform (a modified Haar wavelet) provided an integer-based transformation and reconstruction. As evident from the nature of the transformation, it is very difficult to preserve precision with floating point operations. However, by a technique referred to as "lifting," any wavelet transformation may be implemented as an integer-based transformation with full reversibility.

Using this "lifting" technique, various wavelet transforms were analyzed and compared, including the S-Transform (Haar wavelet with lifting), a (2+2,2) transform, and a (4,2) transform. Moreover, analysis was done based on the information theoretic entropy values of the resulting sub-bands. Entropy values in base 2 provide the lower bounds on the average length of the variable length code (VLC) through Kraft's Inequality. In addition to the entropy values, the operations required to represent the values of a single entry in each of the four sub-bands were determined. The outcome of the analysis suggested that the optimum wavelet to use for the transformation is the S-Transform. Although other transforms may be employed, in the present embodiment, the S-Transform is preferred; with the emphasis being placed on the speed and complexity of the transformation more so than the resulting compression ratios.

For decomposition of the image data set, a forward one step wavelet transform in one dimension is based on the following equations:

$$L(n)=\lfloor (C(2n)+C(2n+1))/2 \rfloor \text{ for } n \in [0, N/2-1]$$

and $$H(n)=C(2n)-C(2n+1);$$

where $C(i)$ for $i \in [0, N-1]$ represents the input data, L and H are the decomposed low and high frequency components, and C is the input data. The operation designed by the symbols "$\lfloor$ $\rfloor$" produces the greatest integer less than the operands with "N" being the size of the input data.

The converse of this transformation, the one step inverse wavelet transform is described by the following equations:

$$C(2n)=L(n)+\lfloor (H(n)+1)/2 \rfloor$$

and $$C(2n+1)=C(2n)-H(n).$$

An implicit assumption in the foregoing equations is the fact that the data size "N" is even. Though valid for theoretical analysis and description, this assumption may not be valid for certain data sets to be compressed in the present technique. The technique has, however, been adapted to accommodate odd and even sizes of the input data, and to extend the one-dimensional transform to a two-dimensional one, as summarized below.

The equations for the forward and inverse wavelet transforms described above provide one-dimensional single-step transformation. Recursive single-step wavelet decompositions in two dimensions provide the tessellation of the image as depicted in FIG. 14. In the present technique, a recursion of a single-step wavelet transform is performed on the low frequency or "LL" component at every level. The number of levels for the transformation is determined by fixing the row and/or column size of the smallest resolution. This level value is determined by the steps necessary to decompose the maximum of the row or column size of the original image to the desired smallest resolution size. If "n" is this level variable then the following equation is used:

$$n=\log_2(\max(\text{rows},\text{cols}))-\log_2(d_{size})$$

where n is the number of levels of decomposition, "rows" and "cols" are the original image dimensions, $\log_2$ is the log in base 2, and $d_{size}$ is the configurable size of the smallest resolution image.

Special handling of the odd row or column at every level is performed. In a present implementation, the odd row or the odd column is replicated with the aim to force it to be even such that the algorithm for the wavelet transformation is a seamless unit. While this addition adds somewhat to the memory space needed for image storage, the additions are negligible when compression is performed because the high frequency sub-bands will have all zeros in those rows or columns.

Referring to the nomenclature employed above, the two-dimensional one-step forward transformation to decompose a quad o input image data (a, b, c, d) to ll, hl, lh, hh is governed by the following equations:

$$ll = \lfloor (\lfloor (a+b)/2 \rfloor + \lfloor (c+d)/2 \rfloor)/2 \rfloor;$$

$$hl = \lfloor ((a-b)+(c-d))/2 \rfloor;$$

$$lh = \lfloor (a+b)/2 \rfloor - 537\ (c+d)/2 \rfloor;\ \text{and}$$

$$hh = (a-b)-(c-d).$$

In addition to handling the odd row and odd column numbers at every level of the transform, the present technique has been adapted to accommodate the possibility of overflow when using signed or unsigned 16 bit arrays. While all values could be treated as 32 bit values, loss of speed in performing the desired transformations may result, as well as a significant increase in the memory required to process the image. In a present implementation designed for PACS, because a significant majority of the data values lie within 14 bits for unsigned and signed data, to preserve the speed of the algorithm and to create the minimum possible memory map, 16 bit signed and unsigned routines are employed as a default, while checking for overflow conditions, as described below. When an overflow condition is encountered, the 16 bit-based transform routine exits to the appropriate overflow routine.

FIG. 15 illustrates diagrammatically the progressive processing of image data by wavelet decomposition and Huffman code compression to produce a data stream for storage, access and transmission. The general process flow, designated generally by the reference numeral 328 in FIG. 15, begins with the image data set 330, which may be acquired in any suitable manner and which may be preprocessed, such as for dynamic range adjustment, image enhancement, and so forth. This image, designated as a level 0 in the example, is then decomposed by forward wavelet transformation as described above, to provide a data set 332, itself comprising LL, LH, HL and HH data sets. The low frequency data set may then be further decomposed by similar forward wavelet transformation to generate a next level data set 334. Further wavelet transformation on the low frequency data set at each successive level provides a similar data set, until a final data set 336 is reached, which is considered the smallest or lowest resolution data set desired, denoted "n" in the present example.

The data sets obtained by successive wavelet decomposition are then compressed as follows. At each level, the high frequency data sets are compressed in accordance with a modified compression routine, as designated by reference numeral 338. In this modified routine, all processing is substantially identical to that described above, with the exception that the actual values of the data sets are used rather than predicted error values. That is, steps 280-290 illustrated in FIG. 6 are not performed, while other steps, such as subregion analysis, optimum code table selection, and so forth, are performed in substantially the same manner. The modified compression routine performed on the high frequency wavelet transformed data sets is based upon a realization that the wavelet transformed data is already decorrelated in a manner that enables the present compression technique to be applied directly without the need to predict or compute error values.

Because the low frequency data sets for each higher level is further decomposed, information descriptive of these data sets is preserved in the lower levels, with the exception of the lower-most low frequency data set (i.e., the low frequency data set at the nth level). In the present implementation, this data set is compressed in accordance with the predictive error compression technique described above, as indicated by reference numeral 340 in FIG. 15.

Several points should be noted regarding the decomposition and compression summarized in FIG. 15. First, as will be appreciated by those skilled in the art, depending upon the size and type of data analyzed, the values in the Huffman code tables described above, the subregion lengths, and other specific parameters may be adapted to provide the desired compression ratios and speed of compression. Moreover, because successive decomposition of the low frequency data sets results in progressively smaller data sets (halved in both dimensions), these data sets offer the possibility of access, transmission and reconstruction at any of the available levels for the multiresolution compression and decompression aspect of the present technique.

Following compression of the high and low frequency data sets as summarized in FIG. 15, the resulting data is compiled in a data stream or file as indicated by reference numeral 342. In a present embodiment, the data stream includes a descriptive header 344, followed by a series of data sets, including a first set 346 for the lower-most resolution data (including the low and high frequency compressed data), and successive data sets 348, each including high frequency compressed data for the respective level. In a present implementation, the data stream or file includes a header describing the version of the multiresolution scheme, the type of forward transform (sign/unsigned with/without overflow, see the discussion below), the number of levels of wavelet decomposition, the row and column values of every sub-band level (resolution), and the compressed sizes of all the sub-bands from smallest to the largest. Again, the lowest level low frequency data set is compressed using predictive compression as described above, while the high frequency data sets for each level are compressed using the appropriate non-predictive or modified compression scheme. In addition to storing the data storage header at the top of the compressed stream, in a medical diagnostic context, other elements may be stored in a DICOM header. In a present implementation, these include the number of levels "n," row (rr) values (rr(n), rr(n−1), . . . , rr(0)), column (cc) values (cc(n), cc(n−1), . . . , cc(0)), and compressed data size (cxebyte) for every level (cxebyte(n), cxebyte(n−1), . . . , cxebyte(0)).

Figure 16:
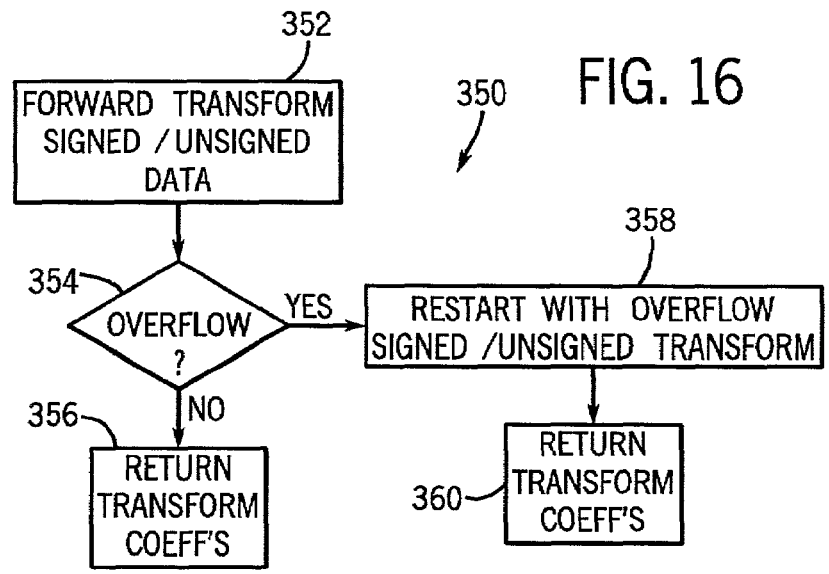
FIG. 16 is a flow chart illustrating exemplary logic in performing forward wavelet transformation in accordance with a present embodiment.

As noted above, in order to provide an efficient implementation from processing and storage standpoints, a present embodiment provides for 16 bit processing, with 32 bit processing only where required by the input data. Referring to FIG. 16, logic for wavelet transformation in accordance with this approach is summarized, as indicated by reference numeral 350. In this implementation, four forward transform routines were coded, one each for signed and unsigned 16 bit data and one each to handle the signed and unsigned overflow conditions (the overflow routines were 32 bit versions of their 16 bit counterparts). Thus, at step 352, a forward transform is performed on the signed and unsigned data. At step 354, the data is analyzed to determine whether overflow processing is needed. If not, the transform coefficients are returned, as noted at step 356, and processing continues as described above. If, however, 32-bit processing is needed, the logic diverts to step 358, where the transform is restarted with overflow, and the transform coefficients from such processing are then returned as noted at step 360. Similar techniques may apply for the processing of 8 bit and color data types.

Figure 17:
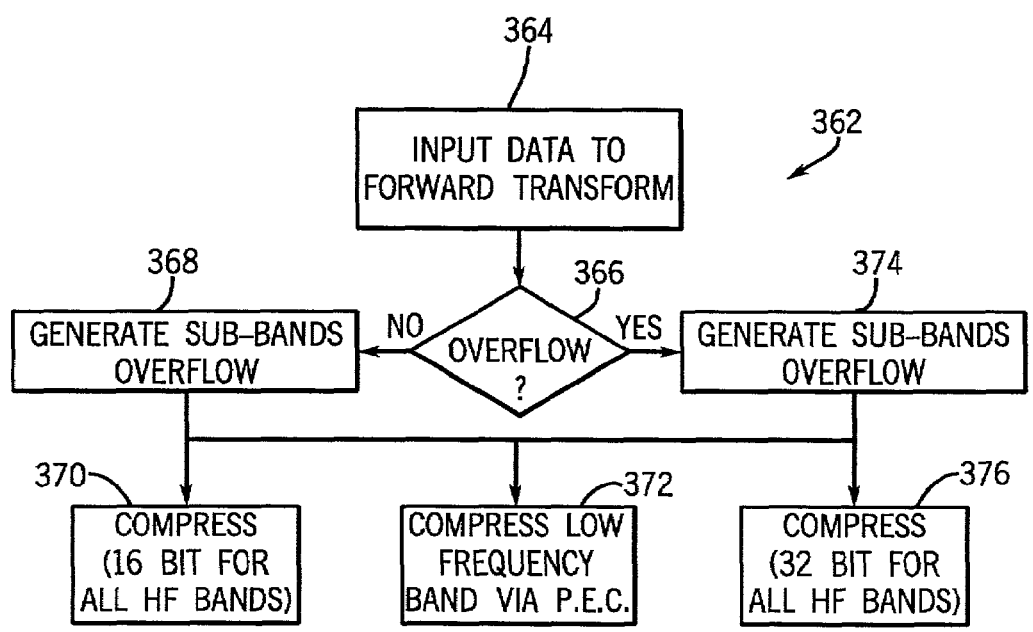
FIG. 17 is a flow chart illustrating exemplary logic in performing forward wavelet decomposition for multiresolution image data compression.

When combined with the compression used at the lowest or nth level of the wavelet decomposed data sets, the foregoing scheme may be summarized as illustrated in FIG. 17. The logic, referred to generally by reference numeral 362, begins at step 364, wherein the image data is input for forward transformation. Four routines were coded in a present implementation, corresponding to the four forward routines. At the reconstruction phase, described below, the encoded type flag signals the appropriate inverse transform routine to be used. This simplifies the reconstruction phase. The process flow summarized in FIG. 17 reflects the implementation in which, along with the non-predictive or modified compression scheme, processing has been adapted to handle the 32 bit signed and unsigned data that was generated by the respective overflow forward transformation routines. Thus, at step 366, it is determined whether overflow has occurred requiring 32-bit processing. If not, the sub-bands or data sets for the successive levels are generated at step 368, and the modified compression technique is carried out for all high frequency data sets of sub-bands, as indicated at step 370. As noted above, the lowest or nth level low frequency data set is compressed in accordance with the predictive compression technique. If, at step 366, it is determined that overflow processing is needed, the sub-bands or data sets are generated at step 374 and the high frequency data sets are compressed via 32 bit processing, as noted at step 376. Again, the low frequency data set for the nth level is compressed at step 372 in accordance with the predictive compression scenario. As noted above, the compression Huffman code tables used for the compression may be adapted in accordance with the exigencies of the data, such at to handle the resulting 18 bit signed and unsigned data. In a present implementation, additional code tables are employed for coding and decoding when the input exceeds 16 bits of storage. The overflow condition has a maximum bit depth of 18 bits signed.

A present implementation of the foregoing technique provides function calls to access all the values that are enumerated above. These elements are not required for the decompression and inverse transform routines as they are present in the header of the compressed stream. However, they are desirable where the user may wish to display images at different resolution levels. The decompression and reconstruction routines may be composed such that for all users no changes to the interface are needed, apart from buffering the reconstructed data. For users with specific needs to display at various resolution levels, user-specific routines may be developed.

A data stream or file map created by the foregoing technique is illustrated in somewhat greater detail in FIG. 18. As discussed above, the data stream or file 342 includes header 344, followed by code valves for the compressed sub-bands or data sets, beginning with the nth data set. Within these data segments, sections 378 encode the low and high frequency sub-bands or data sets. In the following data segments 348, sections 380 encode high frequency sub-bands or data sets for the higher levels. It should also be noted that, as mentioned above, additional code values are included within the data stream for the information discussed above with respect to Huffman code tables used for compression, subregion lengths, and so forth.

FIG. 19 summarizes diagrammatically the process for decompressing and reconstructing images from the compressed data file. The process, designated generally by reference numeral 382, includes accessing the data for the lowest level data sets and for any further data sets through the size or resolution to be provided to the user. Thus, as summarized in FIG. 19, the data from the file is accessed, in accordance with the information stored in the header, and decompressed, with the low frequency data set for the lowest level being decompressed, as indicated at reference numeral 384, in accordance with the predictive error technique discussed above. The high frequency sub-bands or data sets are decompressed, as indicated at reference numeral 386, in accordance with the modified compression technique. That is, rather than treating the decompressed data as predicted errors, the resulting data is treated as wavelet transform coefficients directly.

Following decompression of data up to the desired level, inverse wavelet transformation is performed on the decompressed data, with the lower level image data sets serving as the low frequency sub-band for the next higher image level. Thus, the inverse transform routine operates by treating the smallest resolution "LL" band and combining it with its associated "HL", "LH", and "HH" bands to produce the next higher resolution "LL" band. This process is repeated until either the full resolution of the image is achieved or a specified level of resolution is attained. The one step inverse transform takes the ll, hl, lh, and hh values, that is, the values for the lowest level, and produces the quad pixels for the next level ll band (at the final inverse transformation the full resolution pixel data for the image is produced).

Again, referring to the nomenclature employed above, the one-step two-dimensional inverse transform is governed by the following set of equations:

$$a = ll + \lfloor (hl+1)/2 \rfloor + \lfloor (lh + \lfloor (hh+1)/2 \rfloor) + 1)/2 \rfloor;$$

$$b = ll + \lfloor (hl+1)/2 \rfloor + \lfloor ((lh + \lfloor (hh+1)/2 \rfloor) + 1)/2 \rfloor - (lh + \lfloor (hh+1)/2 \rfloor);$$

$$c = ll + \lfloor (hl+1)/2 \rfloor - hl + \lfloor (lh + \lfloor (hh+1)/2 \rfloor - hh+1)/2 \rfloor;\ \text{and}$$

$$d = (ll + \lfloor (hl+1)/2 \rfloor - hl + \lfloor (lh + \lfloor (hh+1)/2 \rfloor - hh+1)/2 \rfloor) - ((lh + \lfloor (hh+1)/2 \rfloor) - hh).$$

In a present implementation, the design for the inverse transform was made modular with respect to possible single level reconstruction. This allows users to specify a desired level, from the smallest resolution to full resolution, for reconstruction. Moreover, the encoding of the type of forward transform in the compressed data stream allows for the reconstruction using the correct inverse transform routine.

It should be noted that the foregoing technique permits access, transmission and reconstruction of images at any one of the stored sizes and resolutions. Moreover, where zooming or enhanced resolution is desired from an image already accessed by a user, only the additional high frequency bands for the higher resolution level need be accessed and processed for combination with the data already provided for reconstruction of the new image.

The multiresolution aspect of the technique thus provides targeted decompression and reconstruction for a specific level image between 0 and "n." The user provides the appropriate subset of the compressed stream from information present in the header, such as a DICOM header in a medical diagnostic application, with indication of the desired level of reconstruction to a level selection routine. A pixel buffer then allows the user to store the expanded and reconstructed image.

The foregoing novel functionality allows the user to efficiently use available transmission bandwidth. Exemplary compression results are summarized in table 388 of FIG. 20 for an image produced in a medical diagnostic context. In the example, a typical chest CR with image row size of 2048 and column size of 2500 is transformed to five levels. The relevant information of row and column sizes per level and the associated compressed bytes are shown. The 10 MB image is multiresolution compressed to a size of 3,909,848 bytes (the sum of the numbers of bytes listed for each image level in the table). Thus, to reconstruct the full resolution 2048×2500 image would require the transmission of approximately 3.9 MB of data.

The user may, however, access much smaller amounts of data as follows. By way of example, it is assumed that in a typical web-client application the resolution size of a user monitor is about 1 k×1 k. Reviewing the data set forth in table 388, this size limitation would approximately permit reconstruction to level 1. Thus, data required for transmission from the server equals 979,988 bytes (the sum of the bytes comprising the images through level 1. However, in many cases a subset of the full monitor resolution is allocated for the image display component. Consequently, in the example, a first image may be reconstructed to level 2 in a very rapid process, particularly as compared to transmission and reconstruction of the highest resolution image, requiring only 255,428 bytes to be transmitted. As the multi-resolution scheme allows for subsequent zooming to higher levels, then, the remaining 724,560 bytes to reconstruct level 1 from the level 2 image, and subsequently the remaining 2,929,860 bytes to reconstruct the full resolution image from a level 1 reconstructed image.

The foregoing multi-resolution scheme also may be used in conjunction with image tessellation and spatial mapping to provide more efficient data transfer between a client and server, while also providing bookmarking and indexing capabilities to identify, request or recall a particular area of interest (AOI). As described in detail below, the present technique may decompose an image using wavelet decomposition, and then tessellate the decomposed high frequency sub-bands of the image (i.e., HL, LH and HH) into a desired number of spatial blocks. The desired tessellation may be selected based on the size of the image, the network bandwidth, image diagnostics performance, compression efficiency, and various other factors. The present technique also may utilize a variety of tessellation methods, such as strip based tessellation, dyadic tessellation, and fixed size tessellation. In strip based tessellation, the high frequency sub-bands are tessellated into equal size strips. In dyadic tessellation, the number of blocks per resolution level is constant, but the size varies in accordance to a dyadic framework. In fixed size tessellation, the block size is fixed, but the number varies according to the resolution level. In this exemplary embodiment, the fixed size tessellation method is applied to each of the high frequency sub-bands formed by wavelet decomposition. The tessellated sub-band data blocks are then addressed/indexed by resolution level (e.g., level Z between 0 and N) and by spatial coordinates, such as X and Y for a two-dimensional tessellation. Using the foregoing addressing scheme based on resolution level and spatial coordinates of tessellations, the present technique provides unique capabilities for identifying, saving, retrieving, transferring, bookmarking/tracking and recalling the particular area of interest (AOI). Accordingly, the particular area of interest (AOI) may be viewed at a relatively higher image resolution level without requesting or using high-frequency sub-band data for the entire higher image resolution level. The foregoing aspects of the present technique are illustrated in detail below with reference to FIGS. 21 through 27.

Figure 21B:
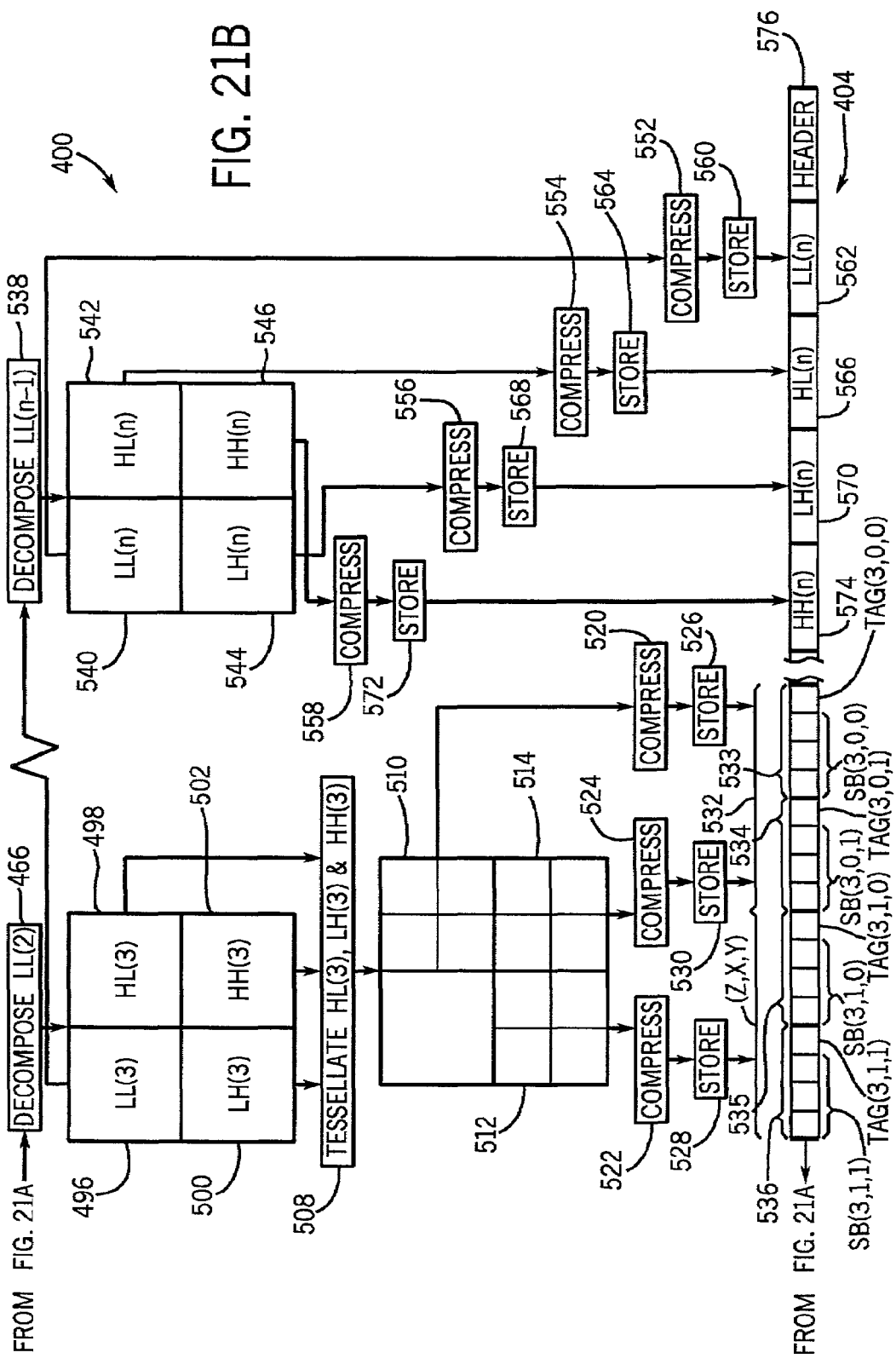
Figure 22A:
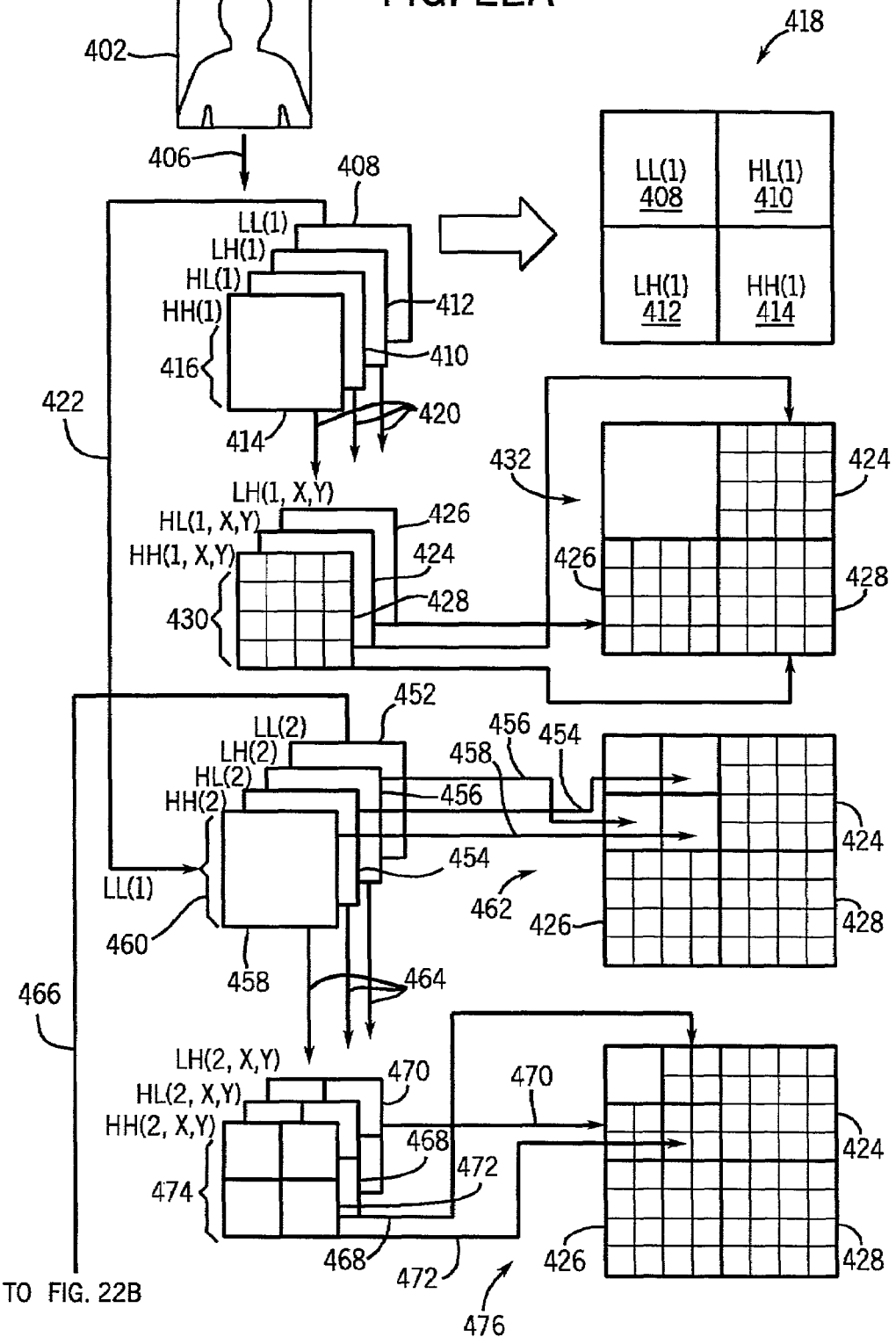
FIGS. 22A and 22B illustrate the image decompositions and tessellations corresponding to the storage scheme illustrated in FIGS. 21A and 21B.
Figure 22B:
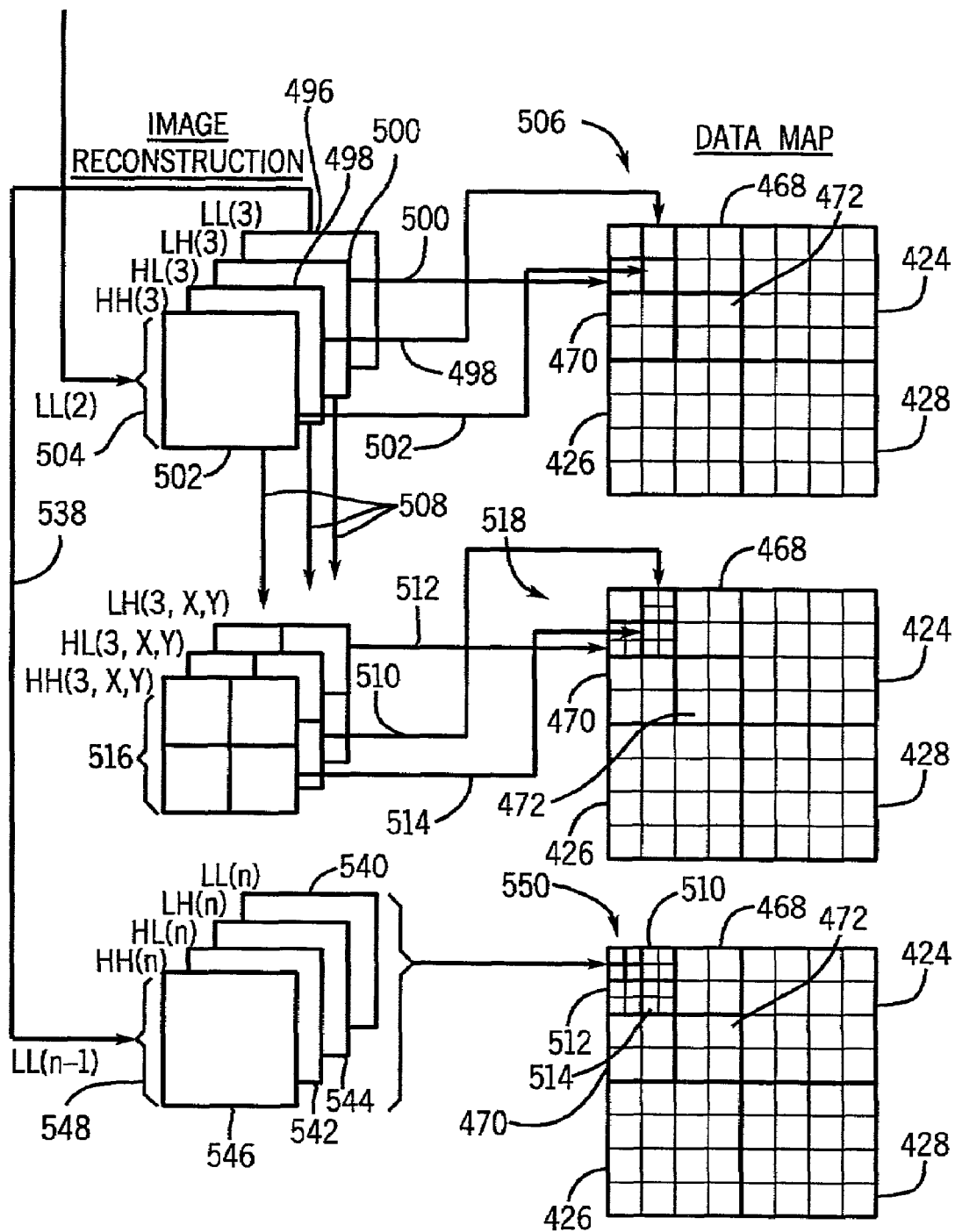

FIGS. 21A and 21B are block diagrams illustrating an exemplary storage and retrieval process 400, which is particularly well suited for the area of interest (AOI) functions described above. The storage and retrieval process 400 is applied to an image 402 (i.e., image data at level "0" or full resolution), such as a medical diagnostic image obtained from an MRI, CR, DX or CT system. However, the process 400 is applicable to any desired two-dimensional or three-dimensional image. As mentioned above, the process 400 decomposes the image 402 into high and low frequency sub-bands, tessellates each of the high frequency sub-bands (i.e., for higher resolution levels) and stores the tessellated high frequency sub-bands addressably within a data stream 404 according to resolution level (e.g., between 0 and N) and spatial coordinates (e.g., X and Y). FIGS. 22A and 22B provide a detailed illustration of the tessellated and compressed sub-band blocks created by the storage and retrieval process 400. Accordingly, the storage and retrieval process 400 is described below with reference to both FIGS. 21 and 22.

The storage and retrieval process 400 begins by executing wavelet decomposition to decompose the image 402 (block 406) into high and low frequency sub-bands LL(1), HL(1), LH(1) and HH(1), which are indicated by reference numerals 408, 410, 412 and 414, respectively. As described above, each of the image sub-bands LL(1), HL(1), LH(1) and HH(1) represents the full spatial dimensions of the image 402. FIGS. 22A and 22B illustrate this geometric equivalence by overlaying the image sub-bands LL(1), HL(1), LH(1) and HH(1) one over the other to form an image stack 416 that collectively represents the resolution of image 402. As described in detail above, the decomposed image also can be illustrated as a data map 418, which has a quadrant for each of the image sub-bands LL(1), HL(1), LH(1) and HH(1). The process 400 proceeds by tessellating each of the high frequency sub-bands HL(1), LH(1) and HH(1) (block 420), while the low frequency sub-band LL(1) is passed to block 422 for further wavelet decomposition. The process 400 selects a desired degree of image tessellation according to a variety of factors, as described above. In this exemplary embodiment, the process 400 tessellates each of the high frequency sub-bands HL(1), LH(1), and HH(1) into a 4×4 array of blocks (i.e., 4 rows×4 columns), which are approximately the same size. The tessellated high frequency sub-bands HL(1), LH(1) and HH(1) are indicated by reference numerals 424, 426 and 428, respectively. Again, the tessellated sub-bands 424, 426 and 428 can be depicted as an image overlay set 430 or a data map 432, as illustrated in FIGS. 21A-B and 22A-B. The process 400 identifies each individual sub-band block within these tessellated sub-bands 424, 426 and 428 according to an addressable function, such as Sub-Band(Z, X, Y). In this addressable function, Z refers to the decomposition level, X refers to the tessellation row number and Y refers to the tessellation column number. As described in detail below, this function Sub-band(Z, X, Y) can be used to store, identify, recall, transfer or otherwise utilize each individual sub-band block within each high frequency sub-band. For example, the tessellated sub-bands 424, 426 and 428 may be identified by addressable functions HL(1, X, Y), LH(1, X, Y) and HH(1, X, Y), respectively. The process 400 then compresses each sub-band block of tessellated sub-band 424 (block 434), each sub-band block of tessellated sub-band 426 (block 436), and each sub-band block of tessellated sub-band 428 (block 438) by successive rows X and columns Y of each respective sub-band. The foregoing compression may embody any suitable compression techniques, such as the modified compression and predictive error compression techniques described in detail above. At blocks 440, 442 and 444, the process 400 stores each spatially equivalent set of compressed high-frequency sub-band blocks, as addressed by Sub-Band(Z, X, Y) or SB(Z, X, Y), into data storage blocks identified by an address header or tag, such as Tag(Z, X, Y). Accordingly, the process 400 stores a Tag(1, X, Y) followed by the high frequency sub-band blocks HL(1, X, Y), LH(1, X, Y) and HH(1, X, Y) into a set of 16 addressable data storage blocks 446 of the data stream 404, each one of the 16 addressable data storage blocks 446 corresponding to one of the addressable units (1, 0, 0), (1, 0, 1), (1, 0, 2), (1, 0, 3), (1, 1, 0), (1, 1, 1), (1, 1, 2), (1, 1, 3), (1, 2, 0), (1, 2, 1), (1, 2, 2), (1, 2, 3), (1, 3, 0), (1, 3, 1), (1, 3, 2), and (1, 3, 3). As discussed above, the foregoing tessellation, indexing, compression and storage techniques facilitate individual identification of specific spatial blocks, thereby allowing the user to retrieve or bookmark sub-band data in a specific area of interest (AOI) within the spatial boundaries of the image 402.

Returning to block 422, the storage and retrieval process 400 proceeds by executing wavelet decomposition to decompose the image sub-band LL(1) into high and low frequency sub-bands LL(2), HL(2), LH(2) and HH(2), which are indicated by reference numerals 452, 454, 456 and 458, respectively. As described above, each of the image sub-bands LL(2), HL(2), LH(2) and HH(2) represents the full spatial dimensions of the image 402. FIGS. 22A and 22B illustrate this geometric equivalence by overlaying the image sub-bands LL(2), HL(2), LH(2) and HH(2) one over the other to form an image stack 460 that collectively represents the resolution of the lower image sub-band LL(1). The decomposed lower image sub-band LL(1) is also illustrated as a data map 462, which has a quadrant for each of the image sub-bands LL(2), HL(2), LH(2) and HH(2). The process 400 proceeds by tessellating each of the high frequency sub-bands HL(2), LH(2) and HH(2) (block 464), while the low frequency sub-band LL(2) is passed to block 466 for further wavelet decomposition. The process 400 selects a desired degree of image tessellation according to a variety of factors, as described above. In this exemplary embodiment, the process 400 tessellates each of the high frequency sub-bands HL(2), LH(2), and HH(2) into a 2×2 array of blocks (i.e., 2 rows×2 columns), which are approximately the same size. The tessellated high frequency sub-bands HL(2), LH(2) and HH(2) are indicated by reference numerals 468, 470 and 472, respectively. Again, the tessellated sub-bands 468, 470 and 472 can be depicted as an image overlay set 474 or a data map 476, as illustrated in FIGS. 21A-B and 22A-B. As described above, the addressable function Sub-Band(Z, X, Y) can be used to store, identify, recall, transfer or otherwise utilize each individual sub-band block within each high frequency sub-band. For example, the tessellated sub-bands 468, 470 and 472 are identified as HL(2, X, Y), LH(2, X, Y) and HH(2, X, Y). The process 400 then compresses each sub-band block of tessellated sub-band 468 (block 478), each sub-band block of tessellated sub-band 470 (block 480), and each sub-band block of tessellated sub-band 472 (block 482) by successive rows X and columns Y of each respective sub-band. The compression operation by blocks 478, 480 and 482 may proceed with the modified compression or predictive error compression techniques described above, or the process 400 may utilize any other suitable compression technique. The process 400 then stores each of the foregoing tessellated and compressed sub-band blocks into the data stream 404. At blocks 484, 486 and 488, the process 400 stores each spatially equivalent set of compressed high-frequency sub-band blocks, as addressed by Sub-Band(Z, X, Y) or SB(Z, X, Y), into data storage blocks 490 identified by an address header or tag, such as Tag(Z, X, Y). Accordingly, the process 400 stores a Tag(2, 0, 0) followed by high frequency sub-band blocks HL(2, 0, 0), LH(2, 0, 0) and HH(2, 0, 0), as indicated by SB(2, 0, 0), into a data storage block 491 of the data stream 404. The process 400 continues through the tessellated sub-band blocks with this addressable storage scheme, storing Tags(Z, X, Y) followed by high frequency sub-band blocks HL(Z, X, Y), LH(Z, X, Y) and HH(Z, X, Y) for the addressable sets (2, 0, 1), (2, 1, 0) and (2, 1, 1) in data storage blocks 492, 493 and 494 of the data stream 404.

Returning to block 466, the storage and retrieval process 400 proceeds to decompose the image sub-band LL(2) into high and low frequency sub-bands LL(3), HL(3), LH(3) and HH(3), which are indicated by reference numerals 496, 498, 500 and 502, respectively. As described above, each of the image sub-bands LL(3), HL(3), LH(3) and HH(3) represents the full spatial dimensions of the image 402. FIGS. 22A and 22B illustrate this geometric equivalence by overlaying the image sub-bands LL(3), HL(3), LH(3) and HH(3) one over the other to form an image stack 504 that collectively represents the resolution of the lower image sub-band LL(2). The decomposed lower image sub-band LL(2) is also illustrated as a data map 506, which has a quadrant for each of the image sub-bands LL(3), HL(3), LH(3) and HH(3). The process 400 proceeds by tessellating each of the high frequency sub-bands HL(3), LH(3) and HH(3) (block 508), while the low frequency sub-band LL(3) is further decomposed by wavelet decomposition. The process 400 selects a desired degree of image tessellation according to a variety of factors, as described above. In this exemplary embodiment, the process 400 tessellates each of the high frequency sub-bands HL(3), LH(3), and HH(3) into a 2×2 array of blocks (i.e., 2 rows×2 columns), which are approximately the same size. The tessellated high frequency sub-bands HL(3), LH(3) and HH(3) are indicated by reference numerals 510, 512 and 514, respectively. Again, the tessellated sub-bands 510, 512 and 514 can be depicted as an image overlay set 516 or a data map 518, as illustrated in FIGS. 21A-B and 22A-B. As described in detail above, the addressable function Sub-Band(Z, X, Y) can be used to store, identify, recall, transfer or otherwise utilize each individual sub-band block within each high frequency sub-band. For example, the tessellated sub-bands 510, 512 and 514 are identified as HL(3, X, Y), LH(3, X, Y) and HH(3, X, Y). The process 400 then compresses each sub-band block of tessellated sub-band 510 (block 520), each sub-band block of tessellated sub-band 512 (block 522), and each sub-band block of tessellated sub-band 514 (block 524) by successive rows X and columns Y of each respective sub-band. The compression operation by blocks 520, 522 and 524 may proceed with any suitable compression technique, such as the modified compression and predictive error compression techniques described above. The process 400 then stores each of the foregoing compressed sub-band blocks into the data stream 404. At blocks 526, 528 and 530, the process 400 stores each spatially equivalent set of compressed high-frequency sub-band blocks, as addressed by Sub-Band(Z, X, Y) or SB(Z, X, Y), into data storage blocks 532 identified by an address header or tag, such as Tag(Z, X, Y). Accordingly, the process 400 stores a Tag(3, 0, 0) followed by high frequency sub-band blocks HL(3, 0, 0), LH(3, 0, 0) and HH(3, 0, 0), as indicated by SB(3, 0, 0), into a data storage block 533 of the data stream 404. The process 400 continues through the tessellated sub-band blocks with this addressable storage scheme, storing Tags(Z, X, Y) followed by high frequency sub-band blocks HL(Z, X, Y), LH(Z, X, Y) and HH(Z, X, Y) for the addressable sets (3, 0, 1), (3, 1, 0) and (3, 1, 1) in data storage blocks 534, 535 and 536 of the data stream 404.

The process 400 continues the foregoing steps of decomposing, tessellation, and compressing and storing individual sub-band blocks for progressively lower image resolution levels to a lowest desired image resolution level N. At this lowest level N, the process 400 does not further decompose the lowest frequency sub-band LL(N). As indicated by block 538, the storage and retrieval process 400 proceeds to decompose the image sub-band LL(N−1) into high and low frequency sub-bands LL(N), HL(N), LH(N) and HH(N), which are indicated by reference numerals 540, 542, 544 and 546, respectively. As described above, each of the image sub-bands LL(N), HL(N), LH(N) and HH(N) represents the full spatial dimensions of the image 402. FIGS. 22A and 22B illustrate this geometric equivalence by overlaying the image sub-bands LL(N), HL(N), LH(N) and HH(N) one over the other to form an image stack 548 that collectively represents the resolution of the lower image sub-band LL(N−1). The decomposed lower image sub-band LL(N−1) is also illustrated as a data map 550, which has a quadrant for each of the image sub-bands LL(N), HL(N), LH(N) and HH(N). The process 400 then compresses the LL(N) sub-band 540 (block 552), compresses the HL(N) sub-band 542 (block 554), compresses the LH(N) sub-band 544 (block 556), and compresses the HH(N) sub-band 546 (block 558) by a suitable compression technique, such as the modified compression or predictive error compression techniques described above. The process 400 then stores the compressed LL(N) sub-band 540 (block 560) into a data block 562, the compressed HL(N) sub-band 542 (block 564) into a data block 566, the compressed LH(N) sub-band 544 (block 568) into a data block 570, and the compressed HH(N) sub-band 546 (block 572) into a data block 574 of the data stream 404.

As discussed above, the data stream 404 comprises one or more headers, such as header 576, which provides a variety of information about the image 402. If a user requests image data for the image 402, then the requesting user receives the data stream 404 in the order of header 576, data blocks 562, 566, 570 and 574 for resolution level N, ... data blocks 533, 534, 535 and 536 for resolution level 3, data blocks 491, 492, 493 and 494 for resolution level 2, and the set of 16 data blocks 446 for resolution level 1. Thus, data stream 404 transmits the image information in the header 576 before the image data, and it transmits the lower resolution levels of image data before the higher resolution levels. Also, each individual data set corresponding to a particular sub-band data block, as addressed by (Z, X, Y), is identified by a header or Tag(Z, X, Y). As described in detail below, the user may request specific portions of the foregoing sub-band data blocks to display an area of interest (AOI) at progressively higher resolution levels. For example, a limited number of the tessellated sub-band blocks may be stored, identified and transferred.

Figure 23:
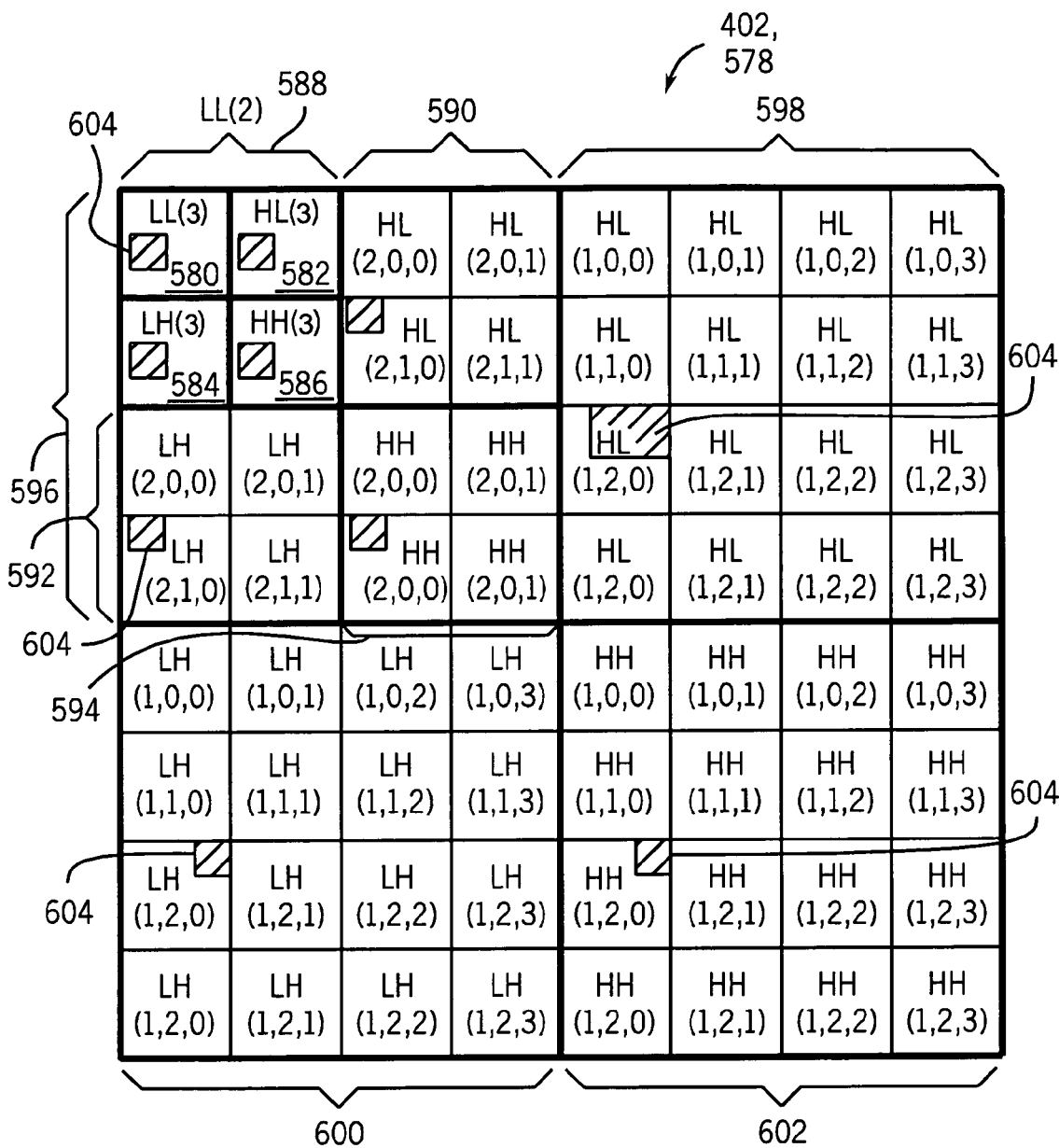
FIG. 23 is an exemplary multilevel data map, which illustrates three levels of decomposition, two levels of tessellation and the corresponding addressable functions for the respective blocks of the data map.

As illustrated in FIG. 23, specific sub-band blocks of image data can be identified based on a data map 578, which represents the image resolution levels from wavelet decomposition and spatial sub-band blocks from tessellation. The data map 578 comprises three levels of wavelet decomposition. As discussed above, the lowest level of wavelet decomposition comprises all four of the image sub-bands LL(3), HL(3), LH(3) and HH(3), which are indicated by reference numerals 580, 582, 584 and 586, respectively. These level 3 sub-bands 580, 582, 584 and 586 collectively represent the relatively higher-level sub-band LL(2) 588 and independently represent the entire spatial dimensions of the image 402. The level 2 sub-bands HL(2), LH(2) and HH(2) are indicated by reference numerals 590, 592 and 594, respectively. The sub-bands LL(2), HL(2), LH(2) and HH(2) 588, 590, 592 and 594 collectively represent the relatively higher-level sub-band LL(1) 596 and independently represent the entire spatial dimensions of the image 402. The level 1 sub-bands HL(1), LH(1) and HH(1) are indicated by reference numerals 598, 600 and 602, respectively. The sub-bands LL(1), HL(1), LH(1) and HH(1) 596, 598, 600 and 602 collectively represent the full resolution of the image 402 and independently represent the entire spatial dimensions of the image 402.

In this exemplary embodiment, every higher level of the image sub-bands HL, LH and HH is tessellated and addressed/indexed by resolution level and spatial blocks in the addressable format (Z, X, Y). If the user desires a higher resolution display of an area of interest (AOI) 604 within the image represented by LL(3), HL(3), LH(3) and HH(3), then the user may identify the spatial sub-band blocks that surround the AOI 604 in the higher resolution level 2 based on the X and Y coordinates of the addressable sub-bands HL(2, X, Y), LH(2, X, Y) and HH(2, X, Y). The number of spatial sub-band blocks and corresponding image data to display the AOI at the higher resolution level 2 depends largely on the degree of tessellation and the position of the AOI 604 relative to the distinct sub-band blocks. In this exemplary embodiment, the spatial sub-band blocks are set to the size of the smallest LL band of wavelet decomposition. However, the process 400 may use any suitable block size for the image tessellations. If the user desires a higher resolution display of the AOI 604, then the user may identify the spatial blocks that surround the AOI 604 in the higher resolution level 1 based on the X and Y coordinates of the addressable sub-bands HL(1, X, Y), LH(1, X, Y) and HH(1, X, Y). It also should be noted that the user may redefine (e.g., expand our contract) the AOI 604 before requesting higher resolution image data (i.e., high frequency sub-band data). However, if the user expands the AOI 604, then additional lower resolution image data may be required along with the additional higher resolution image data.

Figure 24A:
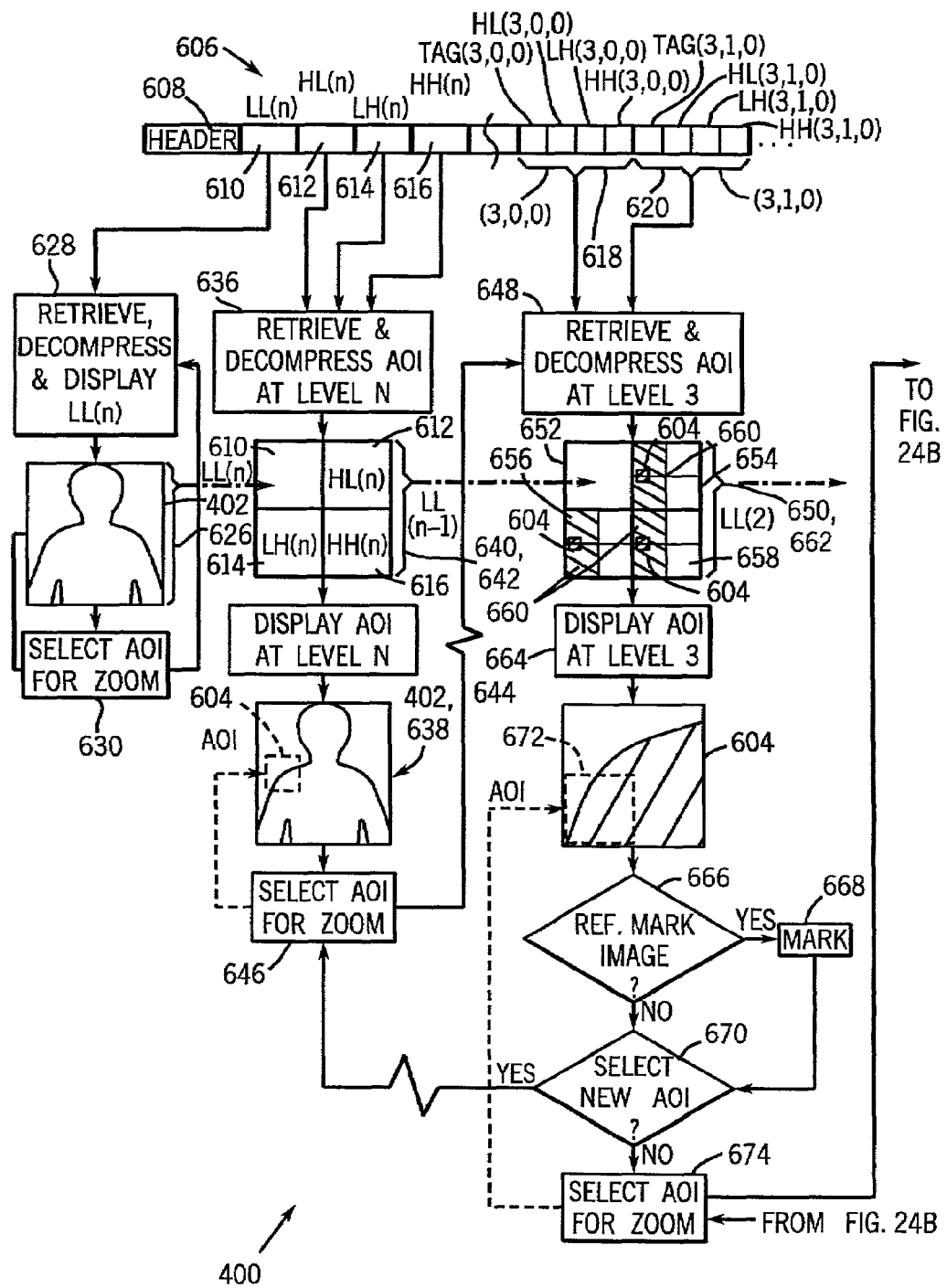
FIGS. 24A and 24B are block diagrams illustrating an exemplary addressable retrieval scheme for the image data that has been addressably stored by the storage scheme of FIGS. 21A and 21B.
Figure 24B:
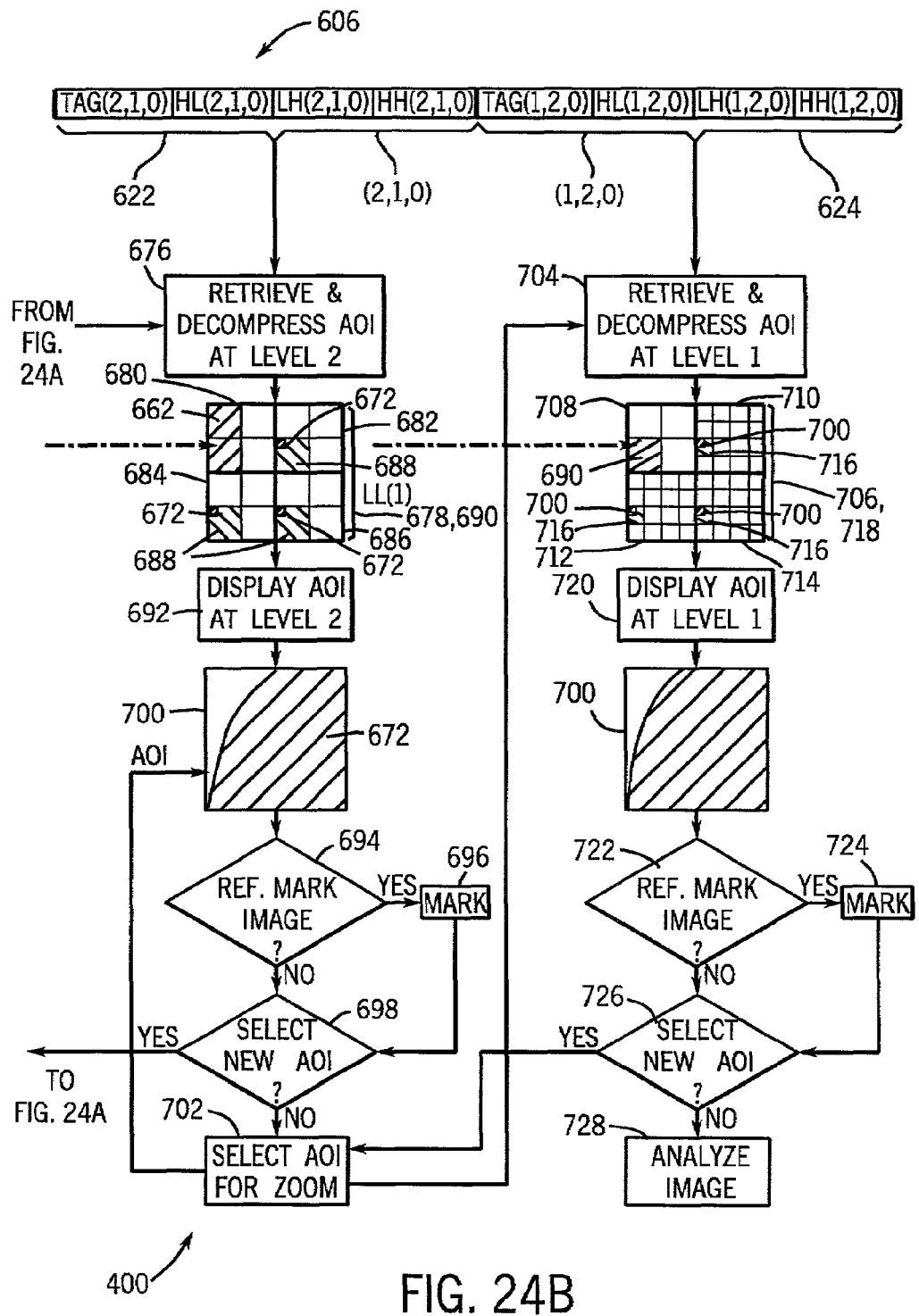

FIGS. 24A and 24B are block diagrams illustrating retrieval and display of the area of interest (AOI) 604 according to the exemplary storage and retrieval process 400. As illustrated in FIGS. 24A and 24B, the storage and retrieval process 400 is applied to an image data stream 606, which comprises a header 608 and image data for progressively higher resolution levels. As illustrated by the data stream 404 of FIGS. 21A and 21B, the image data stream 606 of FIGS. 24A and 24B also comprises a plurality of data blocks corresponding to decomposed and tessellated data. Following the header 608, the image data stream 606 has data blocks 610, 612, 614 and 616, which represent the lowest resolution sub-bands LL(N), HL(N), LH(N) and HH(N) at the highest level N of wavelet decomposition. The image data stream 606 then has progressively higher resolution levels, including compressed and tessellated data for levels 3, 2 and 1. For level 3, the image data stream 606 has data blocks 618 and 620, which represent the level 3 sub-bands HL(3, 0, 0), LH(3, 0, 0) and HH(3, 0, 0) and HL(3, 1, 0), LH(3, 1, 0) and HH(3, 1, 0), respectively. As illustrated, each of these blocks also have as an address header or tag, such as Tag(3, 0, 0) for data block 618 and Tag(3, 1, 0) for data block 620. For level 2, the image data stream 606 has data block 622, which represents the level 2 sub-bands HL(2, 1, 0), LH(2, 1, 0) and HH(2, 1, 0). As illustrated, the data block 622 also has Tag(2, 1, 0) for addressing/locating the high-frequency sub-band data at (2, 1, 0). For level 1, the image data stream 606 has data block 624, which represents the level 1 sub-bands HL(1, 2, 0), LH(1, 2, 0) and HH(1, 2, 0). As illustrated, the data block 624 also has Tag(1, 2, 0) for addressing/locating the high-frequency sub-band data at (1, 2, 0). Accordingly, the process 400 retrieves only those addressable data blocks corresponding to needed high-frequency sub-band data blocks, which are then used to reconstruct the image 402 in the desired area of interest (AOI) surrounded by those retrieved sub-band blocks. FIGS. 24A and 24B illustrate this addressable image retrieval and display process, while FIG. 25 illustrates the level-by-level image data maps for reconstruction of the decomposed and tessellated data.

Figure 25:
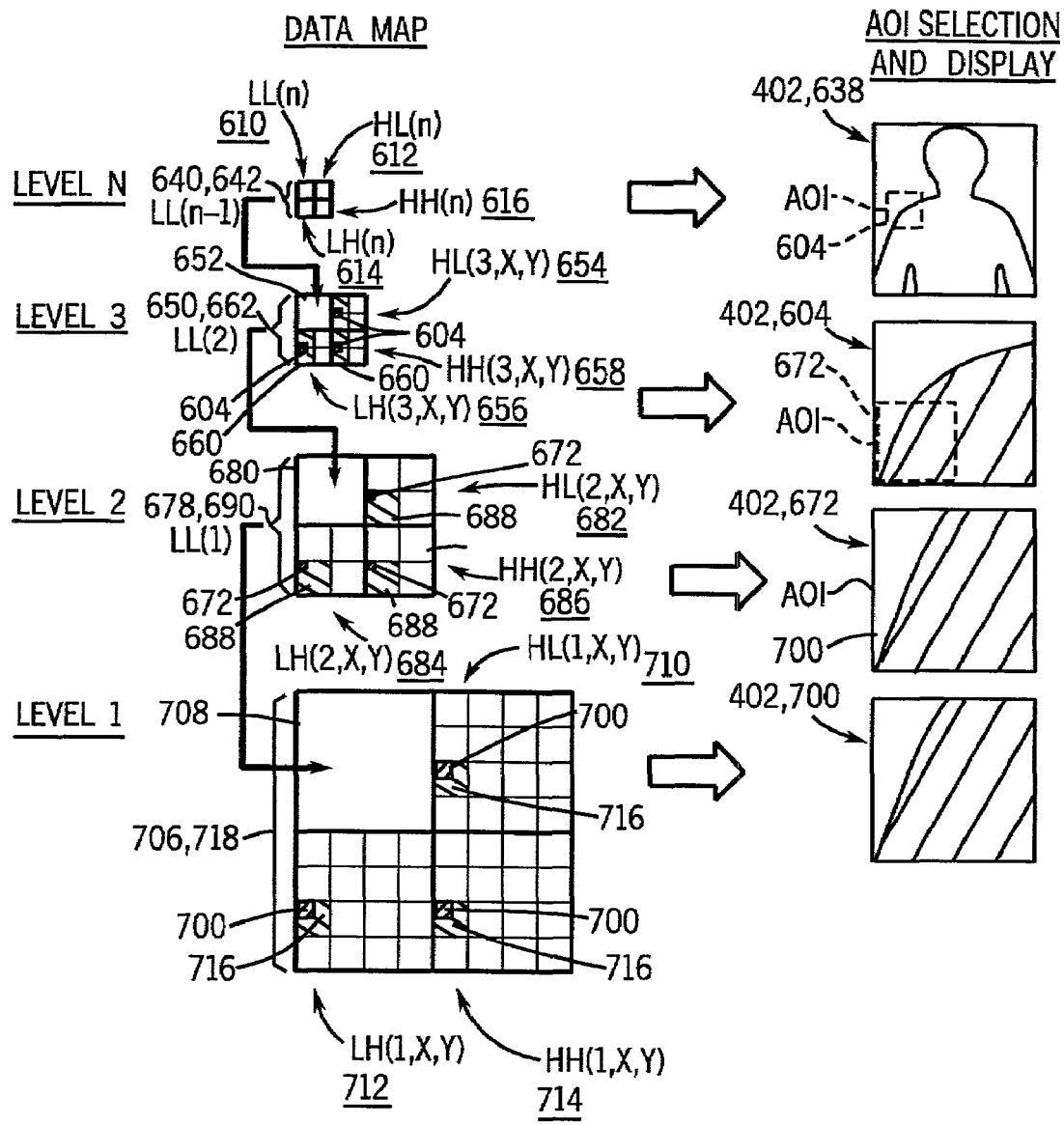
FIG. 25 is an exemplary image reconstruction scheme illustrating the progressively higher resolution images reconstructed from the decomposed and tessellated sub-band data, as set forth in FIGS. 24A and 24B.

Referring to FIGS. 24A-B and 25, the storage and retrieval process 400 begins by retrieving, decompressing and displaying the lowest low-frequency sub-band LL(N), which represents the lowest resolution depiction 626 (level N) of the image 402 (block 628). At block 630, the process 400 allows the user to select an area of interest (AOI) for display at the next resolution level. In this illustration, the process 400 selects the entire spatial boundaries of the image 402 and proceeds to block 636 for reconstruction of the sub-band data at level N. At block 636, the process 400 proceeds to retrieve and decompress the high frequency sub-bands HL(N), LH(N) and HH(N) (block 636), which collectively represent a next lowest resolution depiction 638 (level N−1) of the image 402. The foregoing sub-bands are conveniently disposed in a data map 640, which has a separate quadrant for each of the sub-bands LL(N), HL(N), LH(N) and HH(N). The foregoing sub-bands also represent the low-frequency sub-band LL(N−1) 642, which is used along with the high frequency sub-bands HL(N−2), LH(N−2) and HH(N−2) to reconstruct the image 402 at level N−2. Using reverse wavelet decomposition, the process 400 combines the sub-bands LL(N), HL(N), LH(N) and HH(N) and proceeds to display the image at level N (block 644). As mentioned above, the user may then select the area of interest (AOI) 604 for zooming to the next higher resolution level N−1 (block 646). The process 400 repeats the foregoing retrieval, decompression, reconstruction and AOI selection steps for each progressively higher resolution level until the AOI 604 is displayed at the desired resolution for analysis.

The process 400 proceeds to the next resolution level at block 648, where the process 400 retrieves and decompresses the data blocks 618 and 620, which correspond to the high-frequency sub-bands HL(3, X, Y), LH(3, X, Y) and HH(3, X, Y) that encompass the AOI 604. In this example, the high frequency sub-band blocks at (3, 0, 0) and (3, 1, 1) encompass the AOI 604. The foregoing sub-bands are conveniently disposed in a data map 650, which has a separate quadrant 652, 654, 656 and 658 for each of the sub-bands LL(3), HL(3), LH(3) and HH(3), respectively. As illustrated in the data map 650, the process 400 retrieves high-frequency sub-band data only for blocks addressed by (3, 0, 0) and (3, 1, 0), which correspond to the pairs of spatial sub-band blocks 660 surrounding the AOI 604 in each of the high frequency sub-bands. As discussed above, the process 400 obtains the low-frequency sub-band LL(3) from the combined sub-bands LL(4), HL(4), LH(4) and HH(4) of the previous level 4. The process 400 then combines the foregoing LL(3) sub-band and the blocks 660 for sub-bands HL(3, X, Y), LH(3, X, Y) and HH(3, X, Y) to reconstruct level 3 image data 662 encompassing the dimensions of the pairs of spatial sub-band blocks 660. The reconstructed level 3 image data 662 also represents the low-frequency sub-band LL(2), which is used along with the high frequency sub-bands HL(2, X, Y), LH(2, X, Y) and HH(2, X, Y) to reconstruct the desired AOI at level 2. The process 400 then proceeds to display a portion of the reconstructed level 3 image data 662 corresponding to the AOI 604 (block 664). Using the addressable format Sub-Band(Z, X, Y), the process 400 tracks the displayed AOI 604 for later viewing without storing a separate copy of the AOI 604. The process 400 also may provide a reference option 666 to reference the displayed AOI 604 for retrieval and analysis at a later time. If the user desires a reference mark for the displayed AOI 604, then the process 400 proceeds to reference mark the AOI 604 according to the index numbers in the addressable format Sub-Band(Z, X, Y) for each of the requisite blocks 660 (block 668). In either case, the process 400 also may provide an option 670 to select new dimensions for the AOI 604 (i.e., at least partially encompassing a new area of the image) from the lower resolution level. If the user desires new dimensions for the AOI 604 not encompassed by the reconstructed level 3 image data 662 (i.e., within the dimensions of spatial blocks 660), then the process 400 returns to the lower resolution level for reselection of the AOI 604. Otherwise, the user may then select an area of interest (AOI) 672 for zooming to the next higher resolution level 2 (block 674).

The process 400 proceeds to the next resolution level at block 676, where the process 400 retrieves and decompresses the data block 624, which corresponds to the high-frequency sub-bands HL(2, 1, 0), LH(2, 1, 0) and HH(2, 1, 0) that encompass the AOI 604. The foregoing sub-bands are conveniently disposed in a data map 678, which has a separate quadrant 680, 682, 684 and 686 for each of the sub-bands LL(2), HL(2), LH(2) and HH(2), respectively. As illustrated in the data map 678, the process 400 retrieves high-frequency sub-band data only for blocks addressed by (2, 1, 0), which correspond to spatial sub-band blocks 688 surrounding the AOI 672 in each of the high frequency sub-bands HL(2, 1, 0), LH(2, 1, 0) and HH(2, 1, 0). As described above with reference to block 648, the process 400 obtains the low-frequency sub-band LL(2) (i.e., quadrant 680) from the reconstructed level 3 image data 662. The process 400 then combines the foregoing LL(2) sub-band and the sub-band blocks HL(2, 1, 0), LH(2, 1, 0) and HH(2, 1, 0) to reconstruct level 2 image data 690 encompassing the dimensions of the spatial sub-band blocks 688. The reconstructed level 2 image data 690 also represents the low-frequency sub-band LL(1), which is used along with the high frequency sub-bands HL(1, X, Y), LH(1, X, Y) and HH(1, X, Y) to reconstruct the desired AOI at level 1. The process 400 then proceeds to display a portion of the reconstructed level 2 image data 690 corresponding to the AOI 672 (block 692). Using the addressable format Sub-Band (Z, X, Y), the process 400 tracks the displayed AOI 672 for later viewing without storing a separate copy of the AOI 672. The process 400 also may provides a reference option 694 to reference mark the displayed AOI 672 for retrieval and analysis at a later time. If the user desires a reference mark for the displayed AOI 672, then the process 400 proceeds to reference mark the AOI 672 according to the index numbers in the addressable format Sub-Band(Z, X, Y) for each of the requisite blocks 688 (block 696). In either case, the process 400 also may provide an option 698 to select new dimensions for the AOI 672 (i.e., at least partially encompassing a new area of the image) from the lower resolution level 3. If the user desires new dimensions for the AOI 672 not encompassed by the reconstructed level 2 image data 690 (i.e., within the dimensions of spatial blocks 688), then the process 400 returns to the lower resolution level 3 for reselection of the AOI 672. Otherwise, the user may then select an area of interest (AOI) 700 for zooming to the next higher resolution level 1 (block 702).

The process 400 proceeds to the next resolution level at block 704, where the process 400 retrieves and decompresses the data block 630, which corresponds to the high-frequency sub-bands HL(1, 2, 0), LH(1, 2, 0) and HH(1, 2, 0) that encompass the AOI 604. The foregoing sub-bands are conveniently disposed in a data map 706, which has a separate quadrant 708, 710, 712 and 714 for each of the sub-bands LL(1), HL(1), LH(1) and HH(1), respectively. As illustrated in the data map 706, the process 400 retrieves high-frequency sub-band data only for blocks addressed by (1, 2, 0), which correspond to spatial sub-band blocks 716 surrounding the AOI 700 in each of the high frequency sub-bands HL(1, 2, 0), LH(1, 2, 0) and HH(1, 2, 0). As described above with reference to block 676, the process 400 obtains the low-frequency sub-band LL(1) (i.e., quadrant 708) from the reconstructed level 2 image data 690. The process 400 then combines the foregoing LL(1) sub-band and the sub-band blocks HL(1, 2, 0), LH(1, 2, 0) and HH(1, 2, 0) to reconstruct level 1 image data 718 encompassing the dimensions of the spatial sub-band blocks 716. The reconstructed level 1 image data 718 represents the full resolution of image 402. The process 400 then proceeds to display a portion of the reconstructed level 1 image data 718 corresponding to the AOI 700 (block 720). Using the addressable format Sub-Band(Z, X, Y), the process 400 tracks the displayed AOI 700 for later viewing without storing a separate copy of the AOI 700. The process 400 also may provide a reference option 722 to reference mark the displayed AOI 700 for retrieval and analysis at a later time. If the user desires a reference mark for the displayed AOI 700, then the process 400 proceeds to reference mark the AOI 700 according to the index numbers in the addressable format Sub-band(Z, X, Y) for each of the requisite blocks 716 (block 724). In either case, the process 400 also may provide an option 726 to select new dimensions for the AOI 700 (i.e., at least partially encompassing a new area of the image) from the lower resolution level 2. If the user desires new dimensions for the AOI 700 not encompassed by the reconstructed level 1 image data 718 (i.e., within the dimensions of spatial blocks 716), then the process 400 returns to the lower resolution level 2 for reselection of the AOI 700. Otherwise, the user may proceed to analyze the image 402 within the area of interest (AOI) 700 (block 728).

Figure 26:
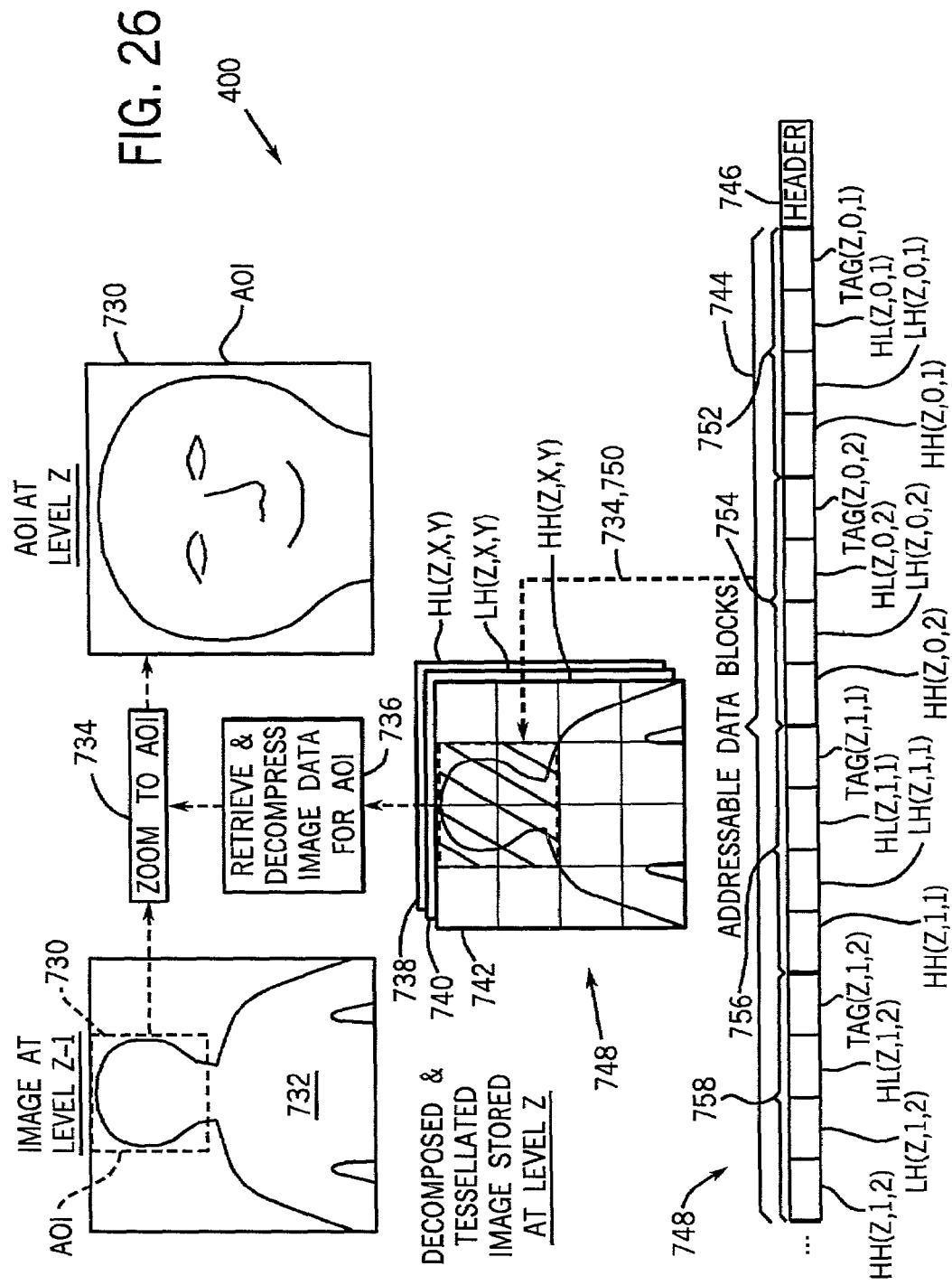
FIG. 26 is a detailed illustration of the addressable storage and retrieval schemes of FIGS. 21A-21B and FIGS. 24A-24B, respectively.

The addressable format Sub-Band(Z, X, Y) is further illustrated in FIG. 26. As illustrated, the process 400 allows a user to select an area of interest (AOI) 730 from an image 732 displayed at a resolution level Z-1 and zoom to the AOI 730 at a relatively higher resolution level Z (block 734). As described in detail above, the process 400 retrieves and decompresses sub-band data for the AOI 730 from the high frequency sub-bands (block 736), which are indicated by reference numerals 738, 740 and 742 for sub-bands HL(Z), LH(Z) and HH(Z), respectively. The sub-bands 738, 740 and 742 are stored in data 744, which comprises a header 746 and a plurality of image data blocks including HL, LH and HH high-frequency sub-bands for at (Z, 0, 1), (Z, 0, 2), (Z, 1, 1) and (Z, 1, 2), which correspond to the spatial sub-band blocks encompassing the AOI 730. The sub-band data for the high frequency sub-bands 738, 740 and 742 is stored block-by-block of image tessellations for the image at level Z. As illustrated, each of the sub-bands 738, 740 and 742 has been tessellated as a 4×4 array of sub-band blocks 748 (i.e., from tessellation) the blocks of which are individually addressable by the addressable functions HL(Z, X, Y), LH(Z, X, Y) and HH(Z, X, Y), respectively. In the present example, the area of interest 730 requires a set of four sub-band data blocks 750 for each of the sub-bands 738, 740 and 742. These data blocks 750 are identified, retrieved and reconstructed from the data 744 according to the addressable format Sub-Band(Z, X, Y) and Tag(Z, X, Y), which addresses the blocks 750 by resolution level, tessellation row and tessellation column. Depending on the particular ordering used within the data 744, these blocks 750 may be identified in the data 744 by sub-band block groups 752, 754, 756 and 758, which correspond to the sub-band blocks at (Z, 0, 1), (Z, 0, 2), (Z, 1, 1) and (Z, 1, 2), respectively. In each of these sub-band block groups 752, 754, 756 and 758, the addressable functions HL(Z, X, Y), LH(Z, X, Y) and HH(Z, X, Y) are used in combination with the Tag(Z, X, Y). Thus, In this illustration, each of the sub-band block groups 752 through 758 represents one spatial sub-band block within the area of interest AOI 730. Accordingly, the present technique facilitates identification and retrieval of specific portions of the image to improve image diagnostic performance, to reduce retrieval and transfer times, and to provide addressing/referencing capabilities for image zooming and retrieval of the area of interest AOI 730. The latter ability to index areas of interest is particularly advantageous, because it allows the user to index and retrieve the AOI 730 by the addressable functions Sub-Band(Z, X, Y) and Tag(Z, X, Y) rather than saving and retrieving the AOI 730 separately from the data 744.

Figure 27:
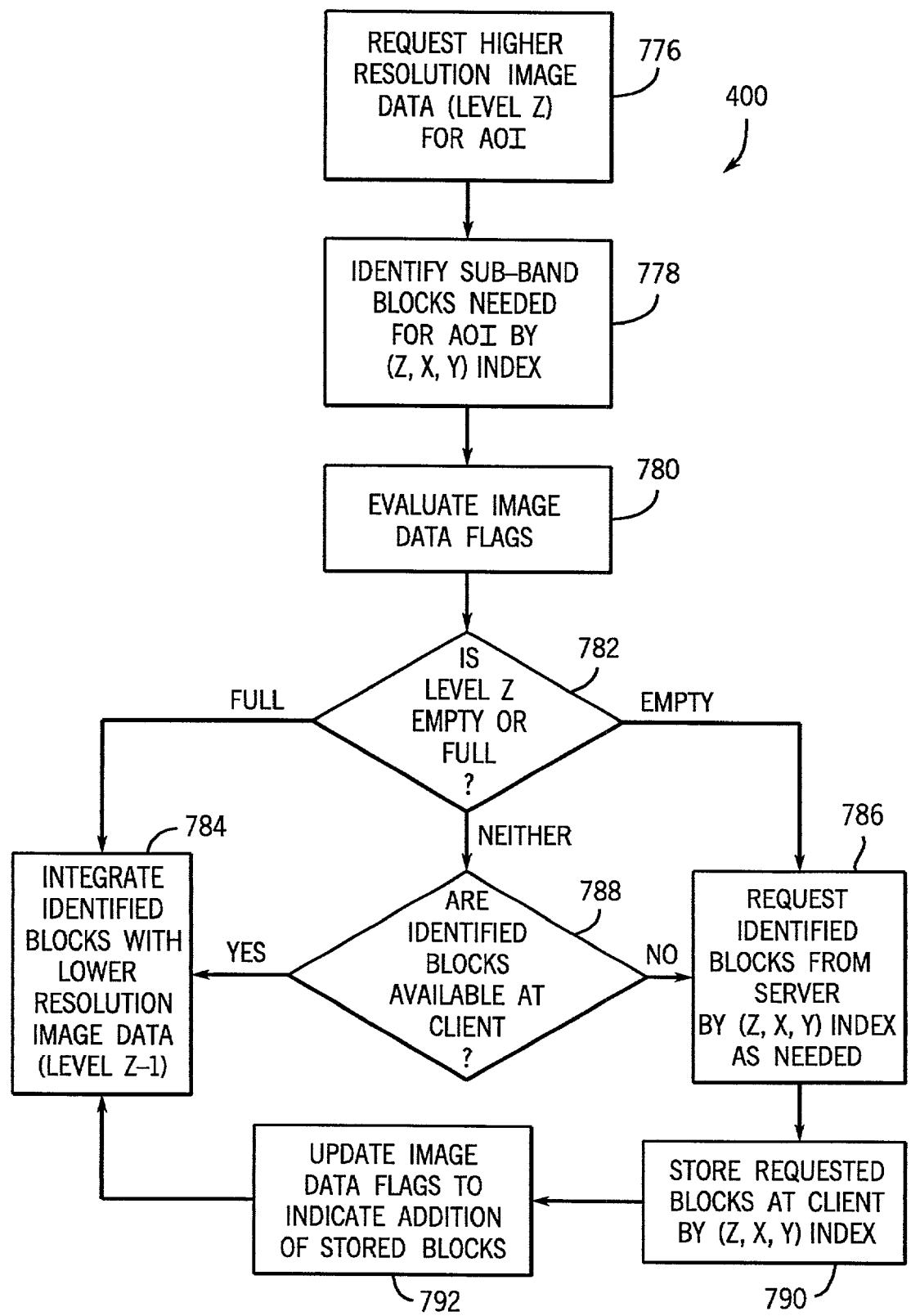
FIG. 27 is a flow chart illustrating an exemplary image tracking scheme for addressable sub-band blocks generated in accordance with the foregoing schemes.

The process 400 also uses a variety of flags and identifiers to facilitate tracking of the addressable sub-band data, which the process may retrieve in small groups during zooming operations, as described above. As mentioned above, these flags and identifiers may include flags to indicate whether the process 400 has already retrieved and incorporated specific tessellated blocks, i.e., Sub-Bands(Z, X, Y), or has already retrieved an entire resolution level into the locally stored image data. For example, a Boolean flag may be used to indicate the presence or absence of particular block or level. FIG. 27 is a flowchart illustrating this tracking aspect of the process 400, which is best understood with reference to FIG. 26. As illustrated, a user may desire a higher resolution depiction (i.e., up to level Z from a current level Z-1) of a particular area of interest (AOI), which requires higher resolution image data (block 776). As described in detail above, the process 400 identifies the sub-band blocks needed for the AOI according to the index (Z, X, Y) of the addressable functions Sub-band(Z, X, Y) and/or Tag(Z, X, Y)(block 778). The process 400 may then evaluate a variety of image data flags, such as those described above (block 780). For example, the process 400 may provide a resolution level query 782, which determines whether the locally stored sub-band data includes a full or empty set of sub-band blocks for the level Z (i.e., all or part of the tessellated sub-bands). If the query 782 determines that the level Z is full (block 782), then the process 400 proceeds to integrate the identified sub-band blocks at level Z with the lower resolution image data at level Z-1 (block 784). If the query 782 determines that the level Z is empty (block 782), then the process 400 proceeds to request the identified sub-band blocks from the server as needed for the AOI based on the (Z, Y, X) addressable format (block 786). However, if the query 782 determines that level Z is neither full nor empty (block 782), then the process 400 proceeds to a sub-band block availability query 788 to determine the local presence or absence of the specifically identified sub-band blocks. If the query 788 determines that the identified sub-band blocks are included in the locally stored image data at the client, then the process 400 proceeds to block 784 for integration of the appropriate sub-band data. However, if the query 788 determines that the identified sub-band blocks are absent from the locally stored image data, then the process 400 proceeds to block 786 for retrieval of the identified sub-band blocks from the server as needed for the AOI. The process 400 then proceeds to store the identified and retrieved sub-band blocks locally at the client based on the (Z, Y, X) addressable format (block 790). The process 400 also updates the image data flags to indicate the addition of sub-band data blocks, such as the sub-band blocks identified and retrieved for the AOI (block 792). These identified and retrieved sub-band data blocks at level Z are then integrated with the lower resolution image data at level Z-1 (block 784).

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for handling image data, the method comprising:
   decomposing the image data into a plurality of data sets using lossless wavelet decomposition;
   tessellating a plurality of the decomposed data sets of the plurality of data sets into a plurality of sub-band blocks;
   compressing each tessellated block of the plurality of sub-band blocks using lossless compression;
   compiling a data stream comprising the compressed plurality of sub-band blocks arranged sequentially in a desired order based upon the decomposition and tessellation, wherein the data stream comprises a plurality of data storage blocks, each data storage block including a plurality of spatially-equivalent sub-band blocks of the plurality of sub-band blocks and a respective address tag that uniquely identifies the plurality of spatially-equivalent sub-band blocks of each respective data storage block, wherein each respective address tag is stored within its data storage block to enable individual identification and retrieval of specific data storage blocks from the plurality of data storage blocks via the address tags of the specific data storage blocks;
   storing the data stream on a server;
   receiving a request for at least a portion of the data stream corresponding to an area of interest of an image to be displayed to a client, wherein the steps of decomposing, tessellating, compressing, compiling, and storing are performed prior to receiving any request from the client for data of the data stream;
   tracking the area of interest for later viewing by the client without storing a separate copy of the portion of the data stream corresponding to the area of interest;
   providing a reference option to the client and receiving from the client an input indicative of a desire to reference mark the area of interest; and
   reference marking the area of interest in response to the client input to facilitate later retrieval and/or analysis of the marked area of interest.

2. The method of claim 1, wherein the lossless wavelet decomposition comprises lossless integer wavelet decomposition.

3. The method of claim 1, wherein tessellating comprises using a fixed block size for the plurality of sub-band blocks.

4. The method of claim 1, wherein tessellating comprises addressing each tessellated block with a tessellation index for each dimension of tessellation.

5. The method of claim 4, wherein addressing comprises providing a decomposition level index for identifying a desired set of the plurality of data sets.

6. The method of claim 1, further comprising selectively transmitting at least a portion of the data stream.

7. The method of claim 6, wherein selectively transmitting comprises selecting the portion based upon a desired set of the plurality of data sets and a desired group of the plurality of sub-band blocks encompassing a region of interest.

8. The method of claim 7, wherein selecting the portion comprises identifying the desired set and each tessellated block of the desired group using an addressable function.

9. The method of claim 1, wherein the data stream comprises a header, which comprises characteristics of the decomposition, the tessellation, and the compression.

10. The method of claim 1, wherein the data stream comprises a resolution level index for each decomposed set, a tessellation row index for each tessellated block, and a tessellation column index for each tessellated block.

11. The method of claim 1, wherein reference marking the area of interest comprises reference marking the area of interest according to at least a tessellation index and a decomposition level index of each sub-band block of the area of interest.

12. The method of claim 1, further comprising storing the data stream based on indices to the decompositions and tessellations.

13. The method of claim 12, wherein storing the data stream comprises storing each of the compressed plurality of sub-band blocks in data groups based on the indices.

14. The method of claim 1, wherein the plurality of data sets correspond to a plurality of resolution levels.

15. The method of claim 1, wherein decomposing the image data using lossless wavelet decomposition comprises creating a hierarchical set of sub-bands, one set comprising a low frequency component at a lowest resolution level and remaining sets comprising high frequency components at successively higher resolution levels.

16. The method of claim 15, wherein compressing each tessellated block comprises compressing the high-frequency components using actual values, and further comprising compressing the low frequency component at the lowest resolution level using prediction errors.

17. The method of claim 1, wherein compressing comprises dividing each tessellated block into subregions to be individually compressed based upon an entropy of each subregion.

18. The method of claim 1, comprising reconstructing an image at least partially from the tessellated blocks.

19. A method for retrieving image data, the method comprising:
   identifying data according to a decomposition level index and tessellation block indices, wherein the decomposition level index refers to data sets generated from an image by lossless wavelet decomposition, and the tessellation block indices refer to blocks tessellated from the data sets;
   transmitting a data stream of the data identified by the decomposition level index and the tessellation block indices, the data stream comprising at least a portion of the data stream corresponding to at least one area of interest of an image to be displayed to a client, wherein the data stream is ordered based upon the decomposition level index and the tessellation block indices, is stored in a losslessly compressed form on a server independent of any request from the client for data of the data sets, and comprises a plurality of data storage blocks that each include a respective address tag embedded therein to facilitate identification and retrieval of particular data storage blocks from the plurality of data storage blocks via the address tags of the particular storage blocks;
   tracking the area of interest for later viewing by the client without storing a separate copy of the portion of the data stream corresponding to the area of interest
   providing a reference option to the client and receiving from the client an input indicative of a desire to reference mark the area of interest; and
   reference marking the area of interest in response to the client input to facilitate later retrieval and/or analysis of the marked area of interest.

20. The method of claim 19, wherein the decomposition level index corresponds to a resolution level.

21. The method of claim 19, comprising a plurality of the decomposition level indices.

22. The method of claim 19, wherein the tessellation block indices comprise a row index and a column index for addressing spatial coordinates of the blocks.

23. The method of claim 22, wherein the data stream is ordered based upon the spatial coordinates of the blocks.

24. The method of claim 19, wherein transmitting the data stream comprises transmitting at least part of a desired one of the data sets identified by the decomposition level index, the desired one corresponding to an image resolution relatively higher than a locally stored one of the data sets.

25. The method of claim 24, wherein transmitting the data stream comprises transmitting specific addressable groups of the blocks for the desired one.

26. The method of claim 19, wherein the lossless wavelet decomposition comprises lossless integer wavelet decomposition.

27. The method of claim 19, wherein the blocks tessellated from the data sets have a fixed block size.

28. The method of claim 19, wherein the data storage blocks each comprise tessellated sub-band data at one index set of the decomposition level index and the tessellation block indices.

29. The method of claim 19, wherein at least one data storage block of the plurality of data storage blocks comprises an addressable data block comprising a plurality of tessellated sub-band blocks identified by the decomposition level index and the tessellation block indices.

30. The method of claim 19, wherein reference marking the area of interest comprises reference marking the area of interest according to the decomposition level index and tessellation block indices to facilitate later retrieval and/or analysis of the marked area of interest by the client.

31. A method for handling image data, the method comprising:
  decomposing the image data into a plurality of resolution levels using lossless wavelet decomposition;
  tessellating at least part of one level of the plurality of resolution levels into a plurality of blocks;
  compressing tessellated data for the at least part of one level of the plurality of resolution levels using lossless compression;
  storing the tessellated and compressed data on a server by referencing the plurality of resolution levels and the plurality of blocks, wherein storing the tessellated and compressed data comprises grouping together a plurality of spatially-equivalent blocks of the plurality of blocks and storing the plurality of spatially-equivalent blocks in an addressable data block comprising the plurality of spatially-equivalent blocks and an address tag uniquely identifying the addressable data block to facilitate individual identification and retrieval of the addressable data block from the tessellated and compressed data;
  receiving a request from the client for at least a portion of the tessellated and compressed data corresponding to an area of interest of an image;
  providing to the client the portion of the tessellated and compressed data corresponding to the area of interest;
  providing a reference option to the client and receiving from the client an input indicative of a desire to reference mark the area of interest; and
  reference marking the area of interest in response to the client input according to decomposition level and tessellation block indices to facilitate later retrieval and/or analysis of the marked area of interest.

32. The method of claim 31, wherein the lossless wavelet decomposition comprises lossless integer wavelet decomposition.

33. The method of claim 31, wherein the plurality of resolution levels comprise a lowest resolution level having a low frequency component and a remaining plurality of resolution levels comprising high frequency components.

34. The method of claim 33, wherein tessellating at least part of one level comprises tessellating only the high frequency components.

35. The method of claim 33, wherein compressing comprises compressing the high frequency components using actual values and compressing the low frequency component of the lowest resolution level using prediction error values.

36. The method of claim 31, further comprising accessing portions of the image data by addressing the tessellated and compressed data based on indices for the plurality of resolution levels and the plurality of blocks.

37. The method of claim 31, further comprising tracking the area of interest for later viewing by the client without storing a separate copy of the portion of the tessellated and compressed data corresponding to the area of interest.

38. A method of storing image data, the method comprising:
  decomposing the image data into a plurality of resolution levels using lossless integer wavelet decomposition;
  tessellating at least part of each decomposed level of the plurality of resolution levels into a plurality of spatial blocks;
  storing data for the plurality of spatial blocks on a server as a plurality of addressable data blocks comprising indices for the resolution levels and spatial image blocks, wherein an addressable data block of the plurality of addressable data blocks comprises a plurality of spatially-equivalent blocks of the plurality of spatial blocks and an address tag uniquely identifying the addressable data block to facilitate individual identification and retrieval of the addressable data block from the stored data;
  receiving a request from the client for at least a portion of the data for the plurality of spatial blocks corresponding to an area of interest of an image;
  providing to the client the portion of the data for the plurality of spatial blocks corresponding to the area of interest;
  providing a reference option to the client and receiving from the client an input indicative of a desire to reference mark the area of interest; and
  reference marking the area of interest in response to the client input according to the indices to facilitate later retrieval and/or analysis of the marked area of interest.

39. The method of claim 38, wherein the plurality of resolution levels comprise a lowest resolution level and a remaining plurality of resolution levels.

40. The method of claim 39, wherein the plurality of resolution levels comprise a lowest resolution level having a low frequency component and a remaining plurality of resolution levels comprising high frequency components.

41. The method of claim 40, wherein tessellating at least part of each decomposed level comprises tessellating the high frequency components.

42. The method of claim 38, further comprising tracking the area of interest for later viewing by the client without storing a separate copy of the portion of the data for the plurality of spatial blocks corresponding to the area of interest.

43. The method of claim 38, wherein storing comprises ordering the plurality of addressable data blocks based on the indices.

44. The method claim 43, wherein storing comprises forming a data stream of the plurality of addressable data blocks.

45. The method of claim 44, wherein forming the data stream comprises providing a header having decomposition statistics and tessellation statistics for the plurality of addressable data blocks.

46. The method of claim 38, wherein storing comprises compressing each of the plurality of addressable data blocks.

47. The method of claim 46, wherein compressing comprises compressing high frequency components of each of the plurality of resolution levels based upon actual values and compressing a low frequency component of a lowest resolution level of the plurality of resolution levels based upon prediction error values.

48. The method of claim 38, further comprising accessing a desired portion of the plurality of spatial blocks based on the indices of the addressable data blocks.

49. A system comprising:
an interface comprising:
a decomposition module configured for decomposing image data using lossless wavelet decomposition to produce a plurality of data sets corresponding to a plurality of resolution levels ranging from a lowest resolution level to a highest resolution level;
a tessellation module configured for tessellating desired portions of the plurality of data sets into a plurality of spatial blocks prior to receipt of any request from a client for data of the image data; and
an addressing module configured for indexing the desired portions into a plurality of addressable data blocks based on the resolution levels and coordinates of the spatial blocks, each addressable data block including a plurality of spatially-equivalent blocks from the plurality of spatial blocks and an embedded address tag that uniquely identifies the respective addressable data block to facilitate individual identification and retrieval of a particular addressable data block from the plurality of addressable data blocks;
a transmission module configured to receive a request from the client for at least a portion of the plurality of spatial blocks corresponding to an area of interest of an image, and to transmit the portion of the plurality of spatial blocks to the client; and
a marking module configured to provide a reference option to the client, to receive from the client an input indicative of a desire to reference mark the area of interest, and to reference mark the area of interest in response to the client input according to the resolution level and the coordinates of the spatial blocks to facilitate later retrieval and/or analysis of the marked area of interest; and
a memory device configured to store the plurality of addressable data blocks.

50. The system of claim 49, wherein the interface comprises a compression module configured for compressing each of the addressable data blocks.

51. The system of claim 49, wherein the interface comprises a storage control module configured for storing each of the addressable data blocks individually on the memory device.

52. The system of claim 51, wherein the image storage module comprises an ordering module configured for storing the addressable data blocks based on the coordinates of the spatial blocks and the resolution level.

53. The system of claim 49, wherein the transmission module is configured for transmitting a desired spatial portion and resolution level of the image data based on indices of the addressable data blocks, the indices comprising a resolution level index and at least two coordinate indices for the spatial blocks.

54. The system of claim 49, further comprising a tracking module configured to track the area of interest for later viewing by the client without storing a separate copy of the portion of the plurality of spatial blocks corresponding to the area of interest.

55. The system of claim 49, further comprising one or more imaging systems.

56. The system of claim 55, wherein the one or more imaging systems comprise an MRI system.

57. The system of claim 55, wherein the one or more imaging systems comprise a computed tomography system.

58. The system of claim 55, wherein the one or more imaging systems comprise a positron emission tomography system.

59. The system of claim 55, wherein the one or more imaging systems comprise a radio fluoroscopy system.

60. The system of claim 55, wherein the one or more imaging systems comprise a computed radiography system.

61. The system of claim 55, wherein the one or more imaging systems comprise an ultrasound system.

62. The system of claim 49, wherein the lossless wavelet decomposition comprises lossless integer wavelet decomposition.

63. A computer program product comprising:
a computer readable medium; and
an image handling module stored on the computer readable medium, comprising:
an image decomposition module configured for decomposing image data using lossless wavelet decomposition to produce a plurality of data sets corresponding to a plurality of resolution levels ranging from a lowest resolution level to a highest resolution level;
a tessellation module configured for tessellating desired portions of the plurality of data sets into a plurality of spatial blocks independent of any request from a client for data of the plurality of data sets;
an addressing module configured for indexing the desired portions into a plurality of addressable data blocks based on the resolution levels and coordinates of the spatial blocks, each addressable data block including a plurality of spatially-equivalent blocks from the plurality of spatial blocks and an embedded address tag that uniquely identifies the respective addressable data block to facilitate individual identification and retrieval of a particular addressable data block from the plurality of addressable data blocks;
a transmission module configured to receive a request from the client for at least a portion of the plurality of spatial blocks corresponding to an area of interest of an image, and to transmit the portion of the plurality of spatial blocks to the client; and
a marking module configured to provide a reference option to the client, to receive from the client an input indicative of a desire to reference mark the area of interest, and to reference mark the area of interest in response to the client input according to the resolution level and at least one tessellation index to facilitate later retrieval and/or analysis of the marked area of interest.

64. The computer program product of claim 63, wherein the image handling module comprises a compression module configured for compressing each of the addressable data blocks.

65. The computer program product of claim 63, wherein the image handling module comprises a storage control module configured for storing each of the addressable data blocks individually on the machine readable medium.

66. The computer program product of claim 63, wherein the image handling module comprises an access module configured for providing access to a desired spatial portion and resolution level of the image data based on indices of the addressable data blocks, the indices comprising a resolution level index and at least two coordinate indices for the spatial blocks.

67. The computer program product of claim 66, wherein the access module comprises an ordering module configured for transferring the addressable data based on the indices.

68. The computer program product of claim 63, wherein the image handling module comprises a tracking module configured to track the area of interest for later viewing by the client without storing a separate copy of the portion of the plurality of spatial blocks corresponding to the area of interest.

69. The computer program product of claim 63, wherein the plurality of data sets comprise a lowest resolution data set having a low frequency component and a remaining plurality of data sets comprising high frequency components.

* * * * *